(12) United States Patent
Takahashi et al.

(10) Patent No.: US 9,540,537 B2
(45) Date of Patent: Jan. 10, 2017

(54) COATING COMPOSITION FOR FORMING GAS BARRIER LAYER, GAS BARRIER FILM, AND METHOD FOR PRODUCING GAS BARRIER FILM

(75) Inventors: Kenichi Takahashi, Tokyo (JP); Manabu Uruno, Tokyo (JP); Kazuya Kimura, Tokyo (JP); Kazuyuki Hanada, Tokyo (JP)

(73) Assignees: DAINICHISEIKA COLOR & CHEMICALS MFG. CO., LTD., Tokyo (JP); UKIMA CHEMICALS & COLOR MFG. CO. LTD., Tokyo (JP)

( * ) Notice: Subject to any disclaimer, the term of this patent is extended or adjusted under 35 U.S.C. 154(b) by 185 days.

(21) Appl. No.: 14/000,053

(22) PCT Filed: Feb. 22, 2012

(86) PCT No.: PCT/JP2012/054266
§ 371 (c)(1),
(2), (4) Date: Aug. 16, 2013

(87) PCT Pub. No.: WO2012/115146
PCT Pub. Date: Aug. 30, 2012

(65) Prior Publication Data
US 2013/0323491 A1 Dec. 5, 2013

(30) Foreign Application Priority Data

Feb. 24, 2011 (JP) ................................ 2011-038977
May 12, 2011 (JP) ................................ 2011-107262

(51) Int. Cl.
| | | |
|---|---|---|
| B29C 47/00 | (2006.01) |
| B29C 47/06 | (2006.01) |
| B29C 47/14 | (2006.01) |
| C08G 71/04 | (2006.01) |
| C08J 7/04 | (2006.01) |
| C09D 175/04 | (2006.01) |
| C09D 175/08 | (2006.01) |
| C09D 175/12 | (2006.01) |

(52) U.S. Cl.
CPC ......... *C09D 175/12* (2013.01); *B29C 47/0021* (2013.01); *C08G 71/04* (2013.01); *C08J 7/047* (2013.01); *C09D 175/04* (2013.01); *C09D 175/08* (2013.01); *B29C 47/065* (2013.01); *B29C 47/14* (2013.01); *C08J 2375/04* (2013.01); *C08J 2475/04* (2013.01); *Y10T 428/1321* (2015.01); *Y10T 428/1352* (2015.01); *Y10T 428/263* (2015.01); *Y10T 428/269* (2015.01); *Y10T 428/31551* (2015.04)

(58) Field of Classification Search
CPC .... B29C 47/0021; B29C 47/065; B29C 47/14; C08G 71/04; C08J 7/047; C08J 2475/04; C08J 2375/04; C09D 175/04; C09D 175/08; C09D 175/12; Y10T 428/269; Y10T 428/263; Y10T 428/31551; Y10T 428/1321; Y10T 428/1352
See application file for complete search history.

(56) References Cited

U.S. PATENT DOCUMENTS

| | | |
|---|---|---|
| 2,522,680 A | 9/1950 | Kropa et al. |
| 3,072,613 A | 1/1963 | Whelan et al. |
| 3,084,140 A | 4/1963 | Gurgiolo et al. |
| 4,892,954 A | 1/1990 | Brindöpke et al. |
| 5,175,231 A | 12/1992 | Rappoport et al. |

FOREIGN PATENT DOCUMENTS

| | | |
|---|---|---|
| EP | 296098 | 12/1988 |
| JP | 57-202317 | 12/1982 |
| JP | 62-045584 | 2/1987 |
| JP | 4185648 | 7/1992 |
| JP | 6-25409 | 2/1994 |
| JP | 7-10283 | 1/1995 |
| JP | 7097424 | 4/1995 |

(Continued)

OTHER PUBLICATIONS

Machine English translation of JP 2006-009001, Ochiai, Jan. 2006.*
Extended European Search Report, Apr. 23, 2015; European Patent Application No. 15151394.2 (11 pages).

(Continued)

*Primary Examiner* — Patrick Niland
(74) *Attorney, Agent, or Firm* — Hamre, Schumann, Mueller & Larson, P.C.

(57) ABSTRACT

Provided are a coating composition for forming a gas barrier layer as configured such that a specific compound having two or more 5-membered cyclic carbonate groups and a compound having two or more amino groups are reactable at an equivalent ratio of functional groups of 0.8 to 1.25 to form the gas barrier layer with a polyhydroxyurethane resin as a principal component; a gas barrier film formed of a single layer or multiple layers, at least one of the layer or layers that forms or form the film is a layer that exhibits gas barrier properties, and the layer is formed of a polyhydroxyurethane resin having a specific chemical structure; and a production method of a film having gas barrier properties. Owing to the use of the specific polyhydroxyurethane resin, the coating composition, gas barrier film and production method readily enable to reduce moisture-dependent variations in gas barrier properties, to avoid the production of noxious fumes upon incineration disposal, to provide excellent processability, and to lower the pollutant load on the environment.

18 Claims, 5 Drawing Sheets

(56) References Cited

FOREIGN PATENT DOCUMENTS

| JP | 7-112518 | 5/1995 |
|---|---|---|
| JP | 7-91367 B | 10/1995 |
| JP | 7-91368 B | 10/1995 |
| JP | 7-316493 | 12/1995 |
| JP | 3100977 | 8/2000 |
| JP | 2000-319504 | 11/2000 |
| JP | 2000319504 | 11/2000 |
| JP | 2001-98047 | 4/2001 |
| JP | 2003-327854 | 11/2003 |
| JP | 3489850 B | 1/2004 |
| JP | 3580331 B | 10/2004 |
| JP | 2005-139435 | 6/2005 |
| JP | 2005154451 | 6/2005 |
| JP | 2006-009001 | 1/2006 |
| JP | 2006009001 | 1/2006 |
| JP | 3801319 B | 7/2006 |
| JP | 3840347 | 11/2006 |
| JP | 2007-291157 | 11/2007 |
| JP | 2007-297544 | 11/2007 |
| JP | 2007297544 | 11/2007 |
| JP | 2008-285539 | 11/2008 |
| JP | 2008291143 | 12/2008 |
| JP | 2011-105827 | 6/2011 |
| WO | WO 89/00565 | 1/1989 |
| WO | WO 99/65969 | 12/1999 |
| WO | WO 03/028644 | 4/2003 |
| WO | WO 2012/026338 | 3/2012 |

OTHER PUBLICATIONS

F. E. Kalinina et al.: "Poly(Hydroxy Urethane) Coatings Prepared from Copolymers of 3-(2-Vinyloxyethoxy)-1,2-propylene Carbonate and N-Phenylmaleimide"; Russian Journal of Applied Chemistry, vol. 81, No. 7, Jul. 2008, pp. 1302-1304.

Goméz et al.: "Synthesis of Polyhydroxy [n]-Polyurethanes Derived from a Carbohydrate Precursor"; Macromolecules 2009, vol. 42, Issue 21, pp. 8112-8117.

\* cited by examiner

[Differential distribution value]

COATING COMPOSITION FOR FORMING GAS BARRIER LAYER, GAS BARRIER FILM, AND METHOD FOR PRODUCING GAS BARRIER FILM

TECHNICAL FIELD

This invention relates to a coating composition for forming a gas barrier layer, a film having gas barrier properties (gas barrier film), and a production method of a gas barrier film. More specifically, the present invention is concerned with a forming technology for gas barrier layers, which is applicable to a broad industrial field to provide gas barrier films equipped with an excellent gas barrier function and widely usable as packaging materials for foods, pharmaceuticals, cosmetics and daily necessaries and also to provide coating compositions for forming gas barrier layers on various base materials to impart anti-corrosion properties or gas barrier properties, and moreover, which is also excellent as a countermeasure for environmental problems in comparison with existing technologies.

BACKGROUND ART

Gas barrier materials and packaging materials making use of them are already well known. For example, gas barrier films are widely used primarily to protect contents as various packaging materials led by food packaging materials and including pharmaceutical packaging materials, and also in the field of industrial materials. As a material that exhibits the most excellent oxygen gas barrier property, an aluminized film can be mentioned. This film, however, involves inter alia a problem in that different from resin films, it is opaque and its content is not visible. Here, representative of resin materials that exhibit gas barrier properties are ethylene-vinyl alcohol copolymer resin (hereinafter abbreviated as "EVOH") and vinylidene chloride resin (hereinafter abbreviated as "PVDC").

The above-mentioned EVOH is excellent in hot melt formability, and is therefore used by processing it into single-layer films by melt extrusion or into double-layer films by co-extrusion with a resin such as polypropylene. EVOH is, however, accompanied by a drawback in that it is prone to moisture absorption and is lowered in gas barrier properties under high humidity. Moreover, limitations are imposed on the use of EVOH because it is hardly soluble in organic solvents and cannot be formed into films by a coating method.

On the other hand, PVDC is a resin, which is less temperature-dependent in gas barrier properties compared with EVOH and is formable by a coating method. The coating method has merits in that compared with a co-extrusion method, it requires simpler production equipment and can obtain films at relatively low cost. In addition, PVDC has substantially no hygroscopicity and exhibits good gas barrier properties even under high humidity, and is therefore applicable to various base materials for their coating irrespective of moisture permeability. Various PVDC-coated films produced by methods such as that described above are used as packaging materials for foods centering around those containing abundant water. Further, films with PVDC films laminated therein are used as gas barrier packaging materials for various foods no matter whether they are dry products or wet products.

Packaging materials formed with PVDC, however, involve issues to be described hereinafter. After use, these packaging materials are discarded as domestic waste from households. There is hence an indication that, as PVDC contains chlorine, chlorine gas which occurs upon incineration disposal causes acid rain. It is also indicated that PVDC produces noxious fumes upon burning and its incineration especially at low temperatures is a cause of the production of organic chlorine compounds considered to have strong carcinogenicity. For these issues, there is an outstanding strong desire for a switch to another material.

For these issues, polyvinyl alcohol (PVC)-based films are also well known as another gas barrier material that produces no organic chlorine compound, and films with a water-soluble PVA-based resin coated thereon are available on the market. As PVA is prone to moisture absorption like EVOH, films formed with PVA exhibit highly excellent oxygen gas barrier property under low humidity conditions, but at relative humidities higher than 60%, their oxygen barrier property is drastically deteriorated so that they are considered to have low practical utility under such an environment. The replacement has, therefore, moved ahead only in limited applications.

Concerning improvements in the moisture resistance of EVOH and PVA, numerous studies have been conducted as will be described hereinafter. Contrived include, for example, crosslinking with methacrylic acid (Patent Document 1), the introduction of a second component such as the addition of acrylic acid (Patent Document 2), and a method that provides EVOH or PVA with a crosslinked structure by heat treatment after formation of a film (Patent Document 3), and improvement effects have been obtained to some extent. Such modified EVOH and PVA have, however, not been widely used yet as replacements for PVDC because they require, for example, heat treatment for the production of films.

On the other hand, the developments of gas barrier materials with resins having chemical structures different from olefinic resins are under way. For example, a barrier material with a polyamide resin having amide bonds and a barrier material with a polyurethane resin having urethane bonds have been contrived (Patent Documents 4 and 5). However, these polyamide resin and polyurethane resin need to introduce rigid chemical structures such as meta-xylene skeletons as an essential component, and as a result, the resins have higher melting points. These contrivances are, therefore, accompanied by drawbacks in that they cannot be co-extruded with a general-purpose resin and they are insoluble in organic solvents as in the case of EVOH. It has also been contrived to use the above-mentioned polyurethane resin as an emulsion (Patent Document 6). As a water-based coating formulation, however, a solvent-based coating system cannot be applied as it is. Accordingly, such an emulsion has not substituted yet for a PVDC coating formulation. Gas barrier films also include aluminized films, which have found wide spread utility centrally for snacks. However, as mentioned before, the contents are not visible in this case. Depending on the application, transparent films may be preferred in many instances. The invisibility of the contents may, therefore, become a drawback.

Further, a variety of studies have also been conducted on coating compositions capable of imparting gas barrier properties to various base materials. Concerning, for example, coating compositions making use of an epoxy resin, methods have been proposed to improve the gas barrier properties to oxygen, carbon dioxide and the like by increasing the contents of amine nitrogen in the compositions (Patent Documents 7 and 8). However, further improvements are desired because these coating compositions are not very high in barrier properties and their barrier properties are not high under high humidity conditions. On the other hand, epoxy resin compositions exhibit good performance in gas barrier properties, adhesiveness and chemical resistance, but involve drawbacks that they are short in pot life and poor in workability due to the high reactivity between polyamines and epoxy resins.

Also proposed are a polyurethane resin having gas barrier properties as mentioned above and a gas barrier film containing it (Patent Document 5) and a stretched gas-barrier laminate film making use of a polyurethane-based thermoplastic elastomer (Patent Document 9). However, they are both thermoplastic resins, and are therefore not suited for coating compositions. In addition, these resins are not equipped with any sufficient adhesiveness to base materials. Upon using them as packaging materials for foods and pharmaceuticals, said packaging materials requiring gas barrier properties, it becomes necessary to laminate them as gas barrier layers on conventional general films with an adhesive being additionally applied to opposite sides of the gas barrier layers. Therefore, the above-described materials involve disadvantages in the manufacturing cost of laminated films and the process step of lamination, and moreover, there is a concern about effects on the environment by an increase in waste materials that is considered as a problem these days.

As has been described above, no resins or other materials have been developed yet to completely replace PVDC. It is, accordingly, a current situation that PVDC is still continuously used at present. It is thus practiced in some incineration plants to burn waste materials at temperatures higher than usual in order to decompose noxious fumes that occur upon incineration. However, high-temperature incinerators require more energy than general incineration, and cannot be considered to be preferable in that they increase carbon dioxide emissions which have become a problem in recent years. It is, therefore, required to develop a material that not only suppresses the occurrence of noxious fumes but also takes one step forward and leads to a reduction in carbon dioxide emissions. Under the above-described circumstances, the present inventors came to realize the importance of expanding the range of a study for the development of a new material that leads to a reduction in carbon dioxide emissions, and also of studying the applicability of materials which are new resins different in chemical structure from the conventional urethane resins, for example, like polyhydroxyurethane resins and moreover have not been used as forming materials for gas barrier films to date.

PRIOR ART DOCUMENTS

Patent Documents

Patent Document 1: JP-A-7-10283
Patent Document 2: JP-B-3801319
Patent Document 3: JP-B-3489850
Patent Document 4: JP-B-3580331
Patent Document 5: JP-A-2001-98047
Patent Document 6: JP-A-2005-39435
Patent Document 7: JP-B-7-91367
Patent Document 8: JP-B-7-91368
Patent Document 9: JP-A-7-112518

DISCLOSURE OF THE INVENTION

Problem to be Solved by the Invention

To overcome these drawbacks of the conventional technologies, objects of the present invention are, therefore, to find from materials—which have not heretofore been used as materials in coating compositions for forming films (barrier films), which exhibit gas barrier properties, or gas barrier layers on base materials—a material optimal as a material which is applicable to both of a melt forming method and a coating method, does not undergo much humidity-dependent variations in gas barrier properties, does not produce noxious fumes upon incineration disposal, and more preferably, leads to a reduction in carbon dioxide emissions; and by using the optimal material, to develop a coating composition useful for the formation of a gas barrier film and gas barrier layer and also a production method of a gas barrier film, said composition and method being capable of reducing a pollutant load itself on the environment.

Means for Solving the Problem

The above-described problems can be solved by a first aspect of the present invention. Described specifically, in the first aspect of the present invention, there is provided a coating composition for forming a gas barrier layer that exhibits gas barrier properties, wherein the coating composition is configured such that a carbonate compound having at least two 5-membered cyclic carbonate groups and represented by the following formula (1) (Component A) and an amine compound having at least two amino groups (Component B) are reactable at an equivalent ratio of functional groups, as defined the following equation, of 0.8 to 1.25 to form the gas barrier layer with a polyhydroxyurethane resin as a principal component.

Formula (1)

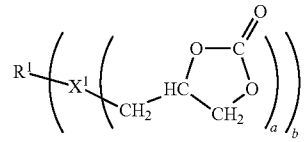

wherein $X^1$ represents one of O, N and $NR_2$, $R_2$ is a hydrogen atom or an alkyl group having 1 to 3 carbon atoms, a is 1 when $X^1$ is O or $NR_2$ or 2 when $X^1$ is N, b is an integer of at least 1 that satisfies a×b=at least 2, and $R_1$ is an aliphatic or aromatic hydrocarbon group and may contain at least one of O atoms and N atoms in a structure thereof.

Equivalent ratio of functional groups=(mass of the carbonate compound in the coating composition×number of functional groups in the carbonate compound÷molecular weight of the carbonate compound)/(mass of the amine compound in the coating composition×number of functional groups in the amine compound÷molecular weight of the amine compound)

wherein the number of functional groups in the carbonate compound means the number of cyclic carbonate structures which the carbonate compound has in a molecule thereof, and the number of functional groups in the amine compound means the number of amino groups which the amine compound has in a molecule thereof.

As preferred embodiments of the first aspect of the present invention, carbon dioxide may have been used as a forming material for —CO—O— bonds in the 5-membered cyclic carbonate groups, and carbon dioxide derived from the carbon dioxide as the forming material may be contained at 1 to 30 mass % in the gas barrier layer formed from the composition; and the amine compound having the amino groups (Component B) may comprise at least one of meta-xylylenediamine and 1,3-bis(aminomethyl)cyclohexane.

In an embodiment of the first aspect of the present invention, there is provided a gas barrier film, wherein the gas barrier film is a single-layer or multilayer gas barrier film having a gas barrier layer, which has been formed from any one of the above-described coating compositions, and the gas barrier layer has a thickness of 0.1 to 200 μm and an oxygen permeation rate of not higher than 50 mL/m²·24 h·atm under conditions of a temperature of 23° C. and a humidity of 0% to 90%.

In another embodiment of the first aspect of the present invention, there is provided a production method of a gas barrier film formed of a single layer or multiple layers, at least one of said layer or layers that forms or form the film being a gas barrier layer that exhibits gas barrier properties, which comprises applying, to a surface of a base material or a surface of a release paper, a coating composition that a carbonate compound represented by the above-described formula (1) (Component A) and an amine compound having at least two amino groups (Component B) are reactable at an equivalent ratio of functional groups, as defined by the following equation, of 0.8 to 1.25 to form a polyhydroxyurethane resin, and then conducting heating as needed, whereby the gas barrier layer is formed.

Equivalent ratio of functional groups=(mass of the carbonate compound in the coating composition×number of functional groups carbonate compound÷molecular weight of the carbonate compound)/(mass of the amine compound in the coating composition×number of functional groups in the amine compound÷molecular weight of the amine compound).

wherein the number of functional groups in the carbonate compound means the number of cyclic carbonate structures which the carbonate compound has in a molecule thereof, and the number of functional groups in the amine compound means the number of amino groups which the amine compound has in a molecule thereof.

As a preferred embodiment of the above-described production method of the gas barrier film, the amine compound having the amino groups (Component B) may comprise at least one of meta-xylylenediamine and 1,3-bis(aminomethyl)cyclohexane.

The above-described problems can also be solved by a second aspect of the present invention. Described specifically, in the second aspect of the present invention, there is provided a gas barrier film formed of a single layer or multiple layers, at least one of said layer or layers that forms or form the film being a layer that exhibits gas barrier properties, wherein the layer that exhibits the gas barrier properties is formed of at least a film of a high molecular resin having, as repeating units of a high molecular backbone thereof, at least one of chemical structures represented by the following formulas (2-1) to (2-4), and the high molecular resin is a polyhydroxyurethane resin containing, as monomer units, a compound having at least two 5-membered cyclic carbonate groups and an amine compound having at least two amino groups and obtained by an addition reaction of the monomer units.

Formula (2-1)

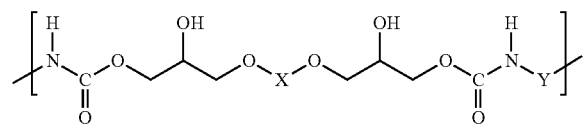

Formula (2-2)

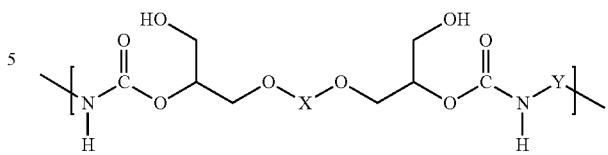

Formula (2-3)

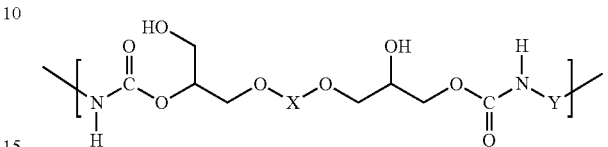

Formula (2-4)

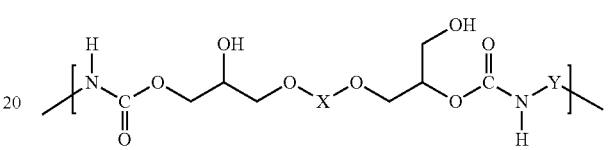

wherein Xs and Ys represent chemical structures formed of hydrocarbons or aromatic hydrocarbons derived from the monomer units, and the structures may each contain at least one of oxygen atoms, nitrogen atoms and sulfur atoms.

As preferred embodiments of the gas barrier film according to the second aspect of the present invention, those equipped with the below-described requirements may be mentioned. The layer that exhibits the as barrier properties may have a thickness of 0.1 to 100 μm, and the film may have an oxygen permeation rate of not higher than 50 mL/m²·24 h·atm under conditions of a temperature of 23° C. and a humidity of 0% to 90%. The polyhydroxyurethane resin may have a weight average molecular weight of 10,000 to 100,000 and a hydroxyl number of 180 to 350 mgKOH/g. The carbonate compound may have been synthesized using carbon dioxide as one raw materials, and —O—CO— bonds derived from the carbon dioxide may account for 1 to 30 mass % of a mass of the polyhydroxyurethane resin obtained using the carbonate compound as monomer units.

In an embodiment of the second aspect of the present invention, there is provided a production method of any one of the above-described gas barrier films, which comprises applying the polyhydroxyurethane resin, which is defined above, in a form of a solution in an organic solvent to a base material, and allowing a volatile component to evaporate such that a resin layer containing the polyhydroxyurethane resin and having the gas barrier properties is formed on the base material.

In another embodiment of the second aspect of the present invention, there is provided any one of the above-described production methods, which comprises using the above-defined polyhydroxyurethane resin, and by melt extrusion, forming a resin film, which contains the polyhydroxyurethane resin and has the gas barrier properties, as the at least one of the layer or layers that forms or form the film.

Advantageous Effects of the Invention

According to the first aspect of the present invention, there is provided a coating composition capable of forming a gas barrier layer that contains, as a principal component thereof, a polyhydroxyurethane resin which can be synthesized using carbon dioxide as one of raw materials. The gas barrier layer can be formed by a simple method that applies the composition and then allows it to cure, and moreover, the thus-formed gas barrier layer does not have much humidity dependency and has high barrier properties, thereby making it possible to provide useful gas barrier films that can be used for various applications. Because the polyhydroxyurethane layer as the gas barrier layer can be formed by the simple method that applies a coating composition containing a cyclic carbonate compound and an amine compound and then cures the coating composition, the polyhydroxyurethane layer can be applied to various base materials to impart gas barrier properties to them, thereby enabling their surface modifications. Further, the first aspect of the present invention can provide a technology that can contribute to resource saving and environmental protection, because the coating composition provided in the aspect can use carbon dioxide as a raw material.

According to the second aspect of the present invention, the use of a resin layer of a polyhydroxyurethane resin, which can be synthesized using carbon dioxide as one of raw materials, can provide a gas barrier film which does not have much humidity dependency and has high barrier properties. Because a melt forming method and a coating method can each be used for the production of the gas barrier film, the second aspect of the present invention provides a production method that can obtain a useful gas barrier film by such a simple forming method. As an advantageous effect of the gas barrier film provided by the second aspect of the present invention in comparison with the PVDC resin applied by a coating method and used in common at present, it has an advantage that no noxious fumes are produced upon burning in disposal or the like. Moreover, the polyhydroxyurethane resin can use carbon dioxide as a raw material for its production. Technical advantageous effects of the second aspect of the present invention, which are available from the replacement by the polyhydroxyurethane resin for the conventional. PVDC resin or the like, are hence extremely significant when its advantageous effects of contribution to resource saving and environmental protection are included.

BRIEF DESCRIPTION OF THE DRAWINGS

[First Aspect]

[Second Aspect]

Figure 5:
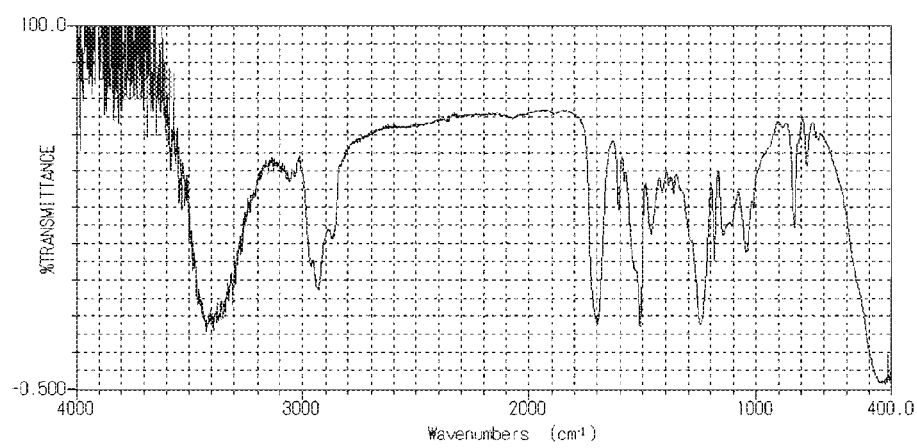

FIG. 5 is a diagram showing an IR spectrum of a polyhydroxyurethane resin used in Example 2-1.

Figure 6:
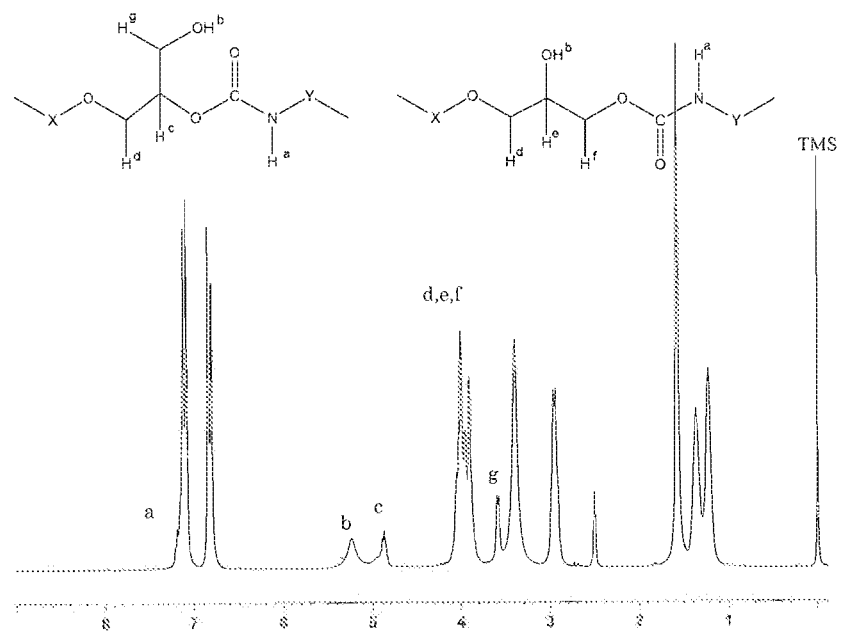

FIG. 6 is a diagram showing an NMR chart of the polyhydroxyurethane resin used in Example 2-1.

Figure 7:
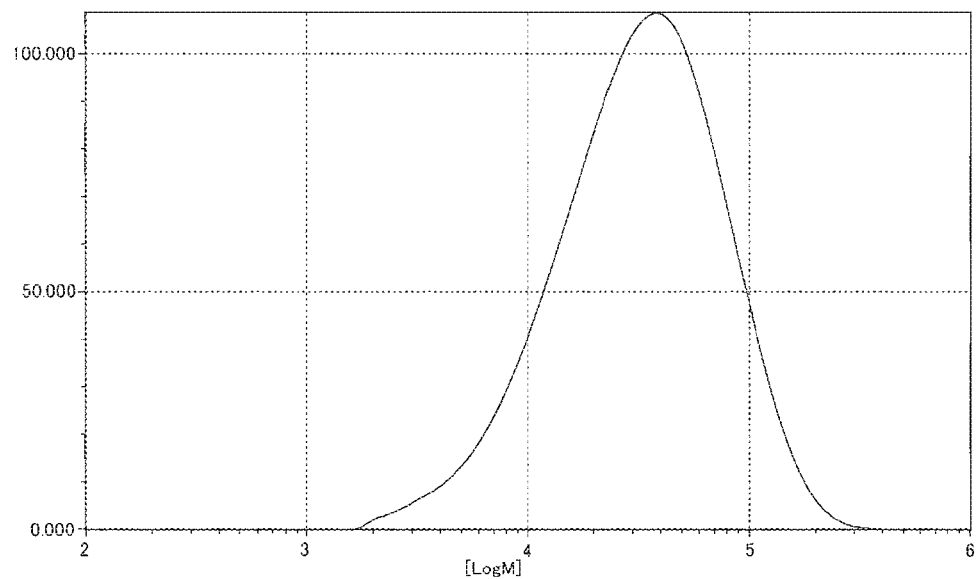

FIG. 7 is a diagram showing a GPC elution curve of the polyhydroxy urethane resin used in Example 2-1.

MODES FOR CARRYING OUT THE INVENTION

The present invention will next be described in further detail based on best modes for carrying out the invention. The present invention is now divided into a first aspect and a second aspect, and these aspects will hereinafter be described successively.

[First Aspect]

First, a description will be made about a coating composition that characterizes the first aspect of the present invention. The coating composition is characterized in that a carbonate compound having at least two 5-membered cyclic carbonate groups and represented by the following formula (1) (Component A) and an amine compound having at least two amino groups (Component B) are reactable at an equivalent ratio of functional groups of 0.8 to 1.25 to form a gas barrier layer with a polyhydroxyurethane resin as a principal component.

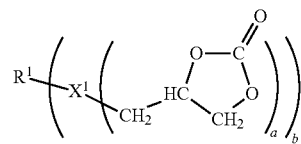

Formula (1)

wherein $X^1$ represents one of C, N and $NR_2$, $R_2$ is a hydrogen atom or an alkyl group having 1 to 3 carbon atoms, a is 1 when $X^1$ is O or $NR_2$ or 2 when $X^1$ is N, b is an integer of at least 1 that satisfies a×b=at least 2, and $R_1$ is an aliphatic or aromatic hydrocarbon group and may contain at least one of O atoms and N atoms in a structure thereof.

A description will hereinafter be made about the polyhydroxyurethane resin that characterizes the present invention. As described above, the polyhydroxyurethane resin is obtained by reacting a cyclic carbonate compound, which has at least two 5-membered cyclic carbonate groups and represented by the above-described formula (1) (Component A) (hereinafter simply called "the cyclic carbonate compound"), and an amine compound, which has at least two amino groups (Component B), at an equivalent ratio of functional groups in the range of from 0.8 to 1.25. In other words, the gas barrier layer that characterizes the present invention is formed of the polyhydroxyurethane resin obtained by reacting the specific component A and component B and contained as a principal component. The basic reaction in the formation of a film that makes up the barrier layer is a reaction between one cyclic carbonate group and one amino group. As the reaction ratio of the component A to the component B, it is the most fundamental condition for the formation of a coating film that the carbonate groups to amino groups contained in the respective compounds are at a relative ratio of 1.0 (equal in number). However, their relative ratio is not necessarily required to be 1.0, but a coating film can still be formed even in a state that either the carbonate groups or the amino groups are excessive. When the relative ratio of both the components is defined in terms of an equivalent ratio of functional groups to be described below, a range in which the formation of a film can be conducted well may be from 0.8 to 1.25 in terms of the equivalent ratio of functional groups.

The term "equivalent ratio of functional groups" as used herein is of a similar concept as the molar equivalent ratio of functional groups, and is calculated by the below-described equation. As a calculation method for the case that two or more cyclic carbonate compounds and two or more amine compounds are used, the equivalent ratio of functional groups can be calculated such that in each of the numerator and denominator, the masses of the two or more compounds are added to obtain the total value of the masses of all the compounds and the molecular weights and numbers of functional groups of the two or more compounds are used as weighted averages based on all the compounds. It is to be noted that the term "number of functional groups" in the below-described equation means the number of cyclic carbonate structures or amino groups which the cyclic carbonate compound or amino compound has in a molecule thereof. About a specific calculation method, a description will be made subsequently herein.

Equivalent ratio of functional groups=(mass of the carbonate compound in the coating composition×number of functional groups in the carbonate compound÷molecular weight of the carbonate compound)/(mass of the amine compound in the coating composition×number of functional groups in the amine compound÷molecular weight of the amine compound)

The above-described cyclic carbonate compound that characterizes the present invention may preferably be one obtained by the reaction between an epoxy compound and carbon dioxide, and specifically, can be obtained as will be described below. For example, an epoxy compound as a raw material is reacted in the presence of a catalyst, at a temperature of 0° C. to 160° C., under a carbon dioxide atmosphere pressurized to atmospheric pressure to 1 MPa or so, for 4 to 24 hours. As a result, a cyclic carbonate compound with carbon dioxide fixed at ester moieties thereof can be obtained.

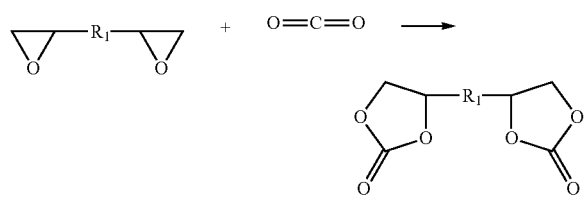

Owing to the use of the cyclic carbonate compound synthesized using carbon dioxide as a raw material as described above, a gas barrier layer comprised of a polyhydroxyurethane resin as a principal component, said polyhydroxyurethane resin having been formed from the resin composition according to the present invention, contains therein —O—CO— bonds with carbon dioxide fixed therein. By using the cyclic carbonate compound having —O—CO-bonds derived from carbon dioxide (with an amount of carbon dioxide fixed therein), carbon dioxide can be incorporated in a range of from 1 to 30 mass % in the gas harrier layer formed from the coating composition according to the present invention. From the standpoint of effective use of carbon dioxide, the higher the content of carbon dioxide, the better.

As the catalyst used in above-mentioned the reaction for obtaining the cyclic carbonate compound from the epoxy compound and carbon dioxide, preferred examples include halides such as lithium chloride, lithium bromide, lithium iodide, sodium chloride, sodium bromide and sodium iodide, and quaternary ammonium salts. Such a catalyst may be used in an amount of 1 to 50 parts by mass, preferably 1 to 20 parts by mass per 100 parts by mass of the epoxy compound as the raw material. Further, triphenylphosphine or the like may also be used at the same time to provide such a salt, that is, such catalyst with improved solubility.

The reaction between the epoxy compound and carbon dioxide can also be conducted in the presence of an organic solvent. As the organic solvent useful in the reaction, any organic solvent can be used insofar as it dissolves the above-mentioned catalyst. Described specifically, preferred examples of the organic solvent include amide solvents such as N,N-dimethylformamide, dimethyl sulfoxide, dimethylacetamide and N-methyl-2-pyrrolidone, alcohol solvents such as methanol, ethanol, propanol, ethylene glycol and propylene glycol, and ether solvents such as ethylene glycol monomethyl ether, ethylene glycol dimethyl ether, propylene glycol methyl ether, diethylene glycol monomethyl ether, diethylene glycol dimethyl ether and tetrahydrofuran.

No particular limitation is imposed on the structure of the cyclic carbonate compound usable in the present invention, and an cyclic carbonate compound can be used insofar as it contains at least two cyclic carbonate groups in a molecule. More preferably, the use of a compound containing at least three cyclic carbonate groups is industrially, advantageous in that the formation time of a cured film can be shortened. It is also preferred if the cyclic carbonate compound is liquid at room temperature, because the coating composition according to the present invention can be prepared without using a solvent.

Cyclic carbonate compounds—each of which has, for example, an aromatic skeleton or an aliphatic, alicyclic and heterocyclic skeleton as a main skeleton of the compound, to which cyclic carbonate groups are bonded—are all usable. As the structure of a linkage between a main skeleton and each associated cyclic carbonate group, the structure of any one of an ether bond, an ester bond and a tertiary amine bond is usable. Compounds usable in the present invention will hereinafter be exemplified.

As cyclic carbonate compounds usable in the present invention and having aliphatic skeletons, respectively, compounds, such as illustrated below, are exemplified.

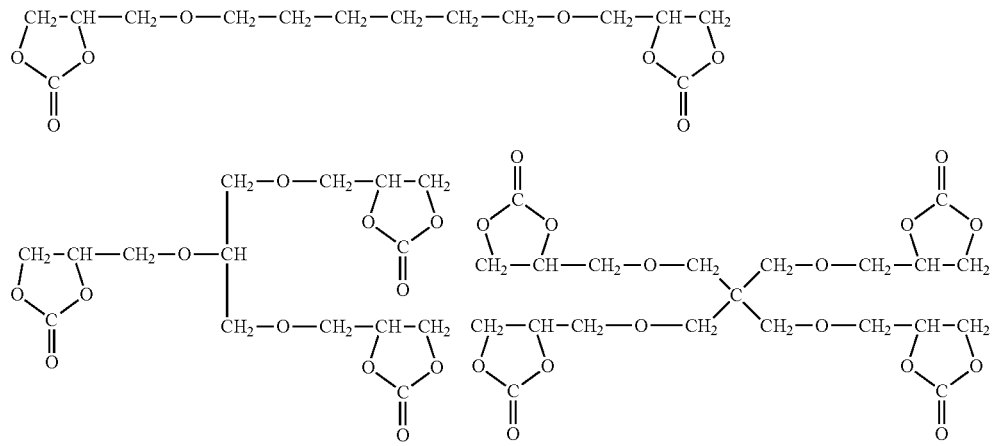

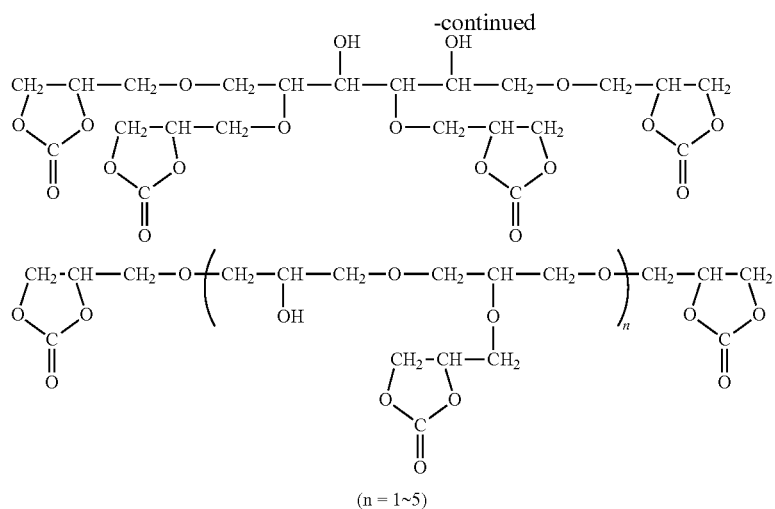
(n = 1~5)
As cyclic carbonate compounds usable in the present invention and having aromatic skeletons, respectively, compounds, such as illustrated below, are exemplified.
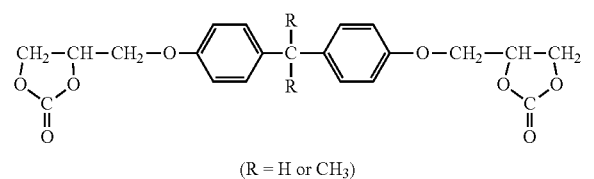
(R = H or CH₃)
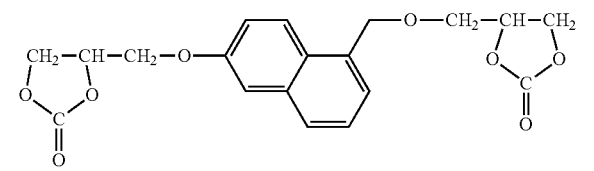
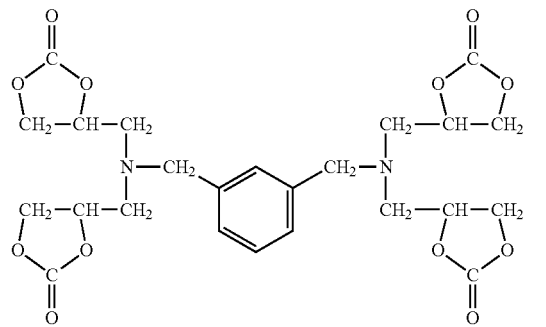
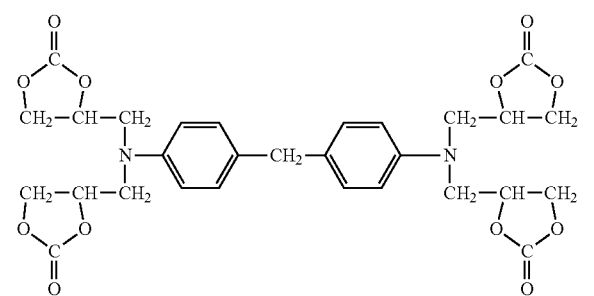
-continued
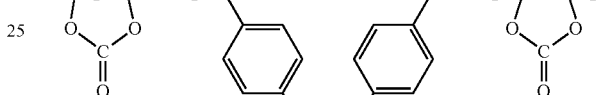
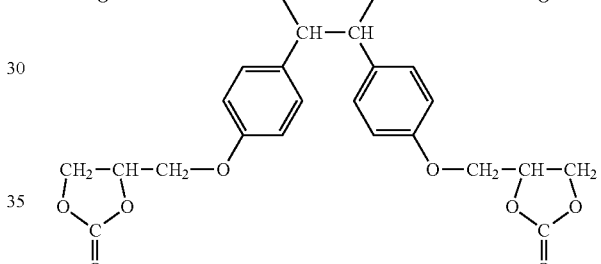
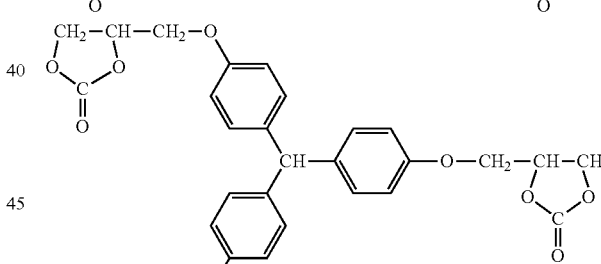
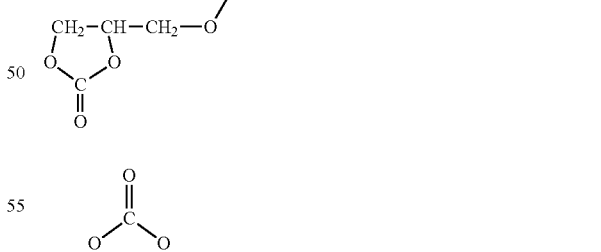
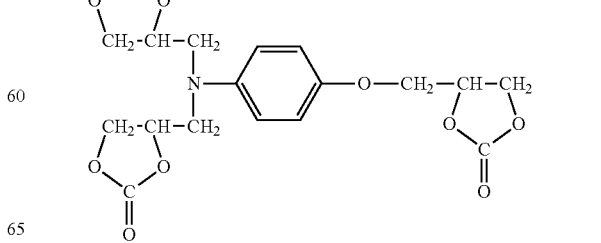

As alicyclic and heterocyclic carbonate compounds usable in the coating composition according to the present invention, compounds, such as illustrated below, are exemplified.

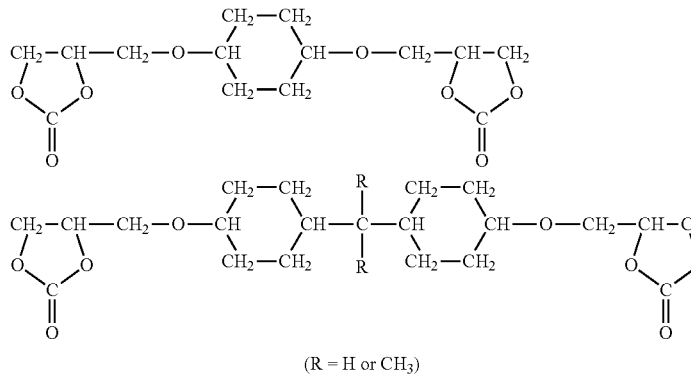

(R = H or CH₃)

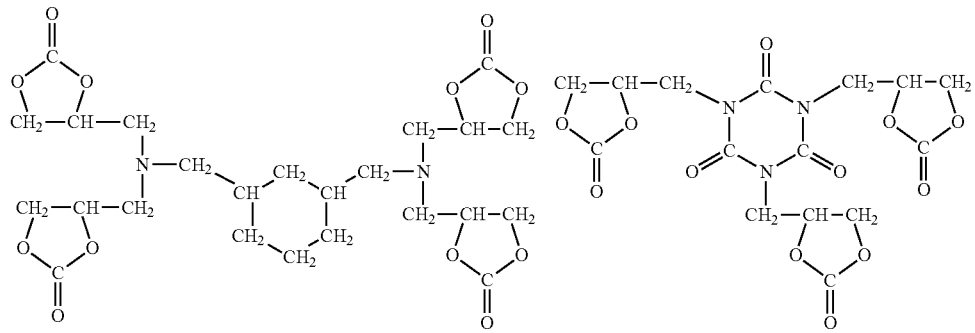

When such a cyclic carbonate compound useful in the present invention is synthesized from an epoxy compound as mentioned above, a situation may be considered to arise in which the fixing reaction of carbon dioxide is insufficient and the cyclic carbonate compound is obtained in a form that a compound with one or more epoxy groups still remaining at a like number of sites thereof and/or the epoxy compound as the raw material is mixed. In the coating composition according to the present invention, however, even a cyclic carbonate compound in the form that an epoxy compound is mixed therein is usable, and further, even with a coating composition prepared by subsequently adding an epoxy compound as a raw material, a good gas barrier layer can still be formed. In such a case, however, a decrease occurs in the amount of carbon dioxide to be fixed in the resulting gas barrier layer because of the increase in the amount of the epoxy compound in the coating composition. Therefore, the proportion of the cyclic carbonate compound may preferably be 50% or higher of the total amount of the cyclic carbonate compound and the epoxy compound.

As the amine compound which is a constituent of the polyhydroxyurethane resin characterizing the present invention and is used together with the above-described cyclic carbonate compound, conventionally-known amine compounds are all usable. Preferred examples include linear aliphatic polyamines such as ethylenediamine, diethylenetriamine, dipropylenetriamine, triethylenetetramine, tetraethylenepentamine, 1,3-diaminopropane, 1,4-diaminobutane, 1,6-diaminohexane, 1,8-diaminooctane, 1,10-diaminodecane and 1,12-diaminododecane, cyclic aliphatic polyamines such as isophoronediamine, norbornanediamine, 1,6-cyclohexanediamine, piperazine, 2,5-diaminopyridine, 4,4'-diaminodicyclohexylmethane, 1,3-bis(aminomethyl)cyclohexane, aliphatic polyamines having aromatic rings such as xylylendiamine, and aromatic polyamines such as methaphenylenediamine and diaminodiphenylmethane. Ethylene oxide adducts and propylene oxide adducts of these compounds can also be mentioned as preferred compounds. Among these, particularly preferred compounds are meta-xylylendiamine and 1,3-bis(aminomethyl)cyclohexane.

The coating composition according to the present invention is characterized in that it can form a gas barrier layer comprised of a polyhydroxyurethane resin as a principal component, said polyhydroxyurethane resin being obtainable by the reaction between the cyclic carbonate compound and amine compound as described above. The polyhydroxyurethane resin is, however, formed as a result of occurrence of the below-described addition reaction between the 5-membered cyclic carbonate structures (which are called "5-membered cyclic carbonate groups" in the present invention, but may hereinafter be also called simply "carbonate groups") in the component A and the amino groups in the component B.

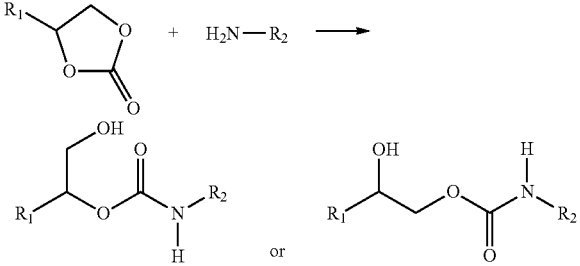

As indicated in the above-described equation, the polyhydroxyurethane resin that characterizes the present invention has at least one of two types of hydroxyurethane structures formed by the addition reaction between the carbonate group and the amino group and including a urethane bond and its adjacent hydroxyl group. These hydroxyurethane structure parts act as important parts in providing a film, which is to be formed with the polyhydroxyurethane resin, with gas barrier properties. Described specifically, it is considered that the hydroxyl groups in these structures form hydrogen bonds between molecules to limit motions of the molecular chains and the film exhibits gas barrier properties. Such a chemical structure is a structure not available from the reaction between an isocyanate compound and a polyol compound in a usual production process of a polyurethane, and this can be considered to characterize the present invention.

As described above, the use of the coating composition according to the present invention makes it possible to provide a single-layer or multilayer gas barrier film having a gas barrier layer formed with the polyhydroxyurethane resin that characterizes the present invention. In the gas barrier film, the gas barrier layer has a thickness of 0.1 to 200 µm, and the gas barrier layer has an oxygen permeation rate of not higher than 50 mL/m$^2$·24 h·atm under conditions of a temperature of 23° C. and a humidity of 0% to 90%. High gas barrier properties have been realized accordingly.

The gas barrier layer of the polyhydroxyurethane resin as formed from the coating composition according to the present invention (which may hereinafter be called "the polyhydroxyurethane layer) may contain an additive, as needed, such that another function may be imparted to the polyhydroxyurethane layer by the additive. It is, therefore, possible to use in the coating composition according to the present invention, for example, anti-oxidants (hindered phenol type, phosphite type, thioether type, and so on), light stabilizers (hindered amine type, and so on), ultraviolet absorbers (benzophenone type, benzotriazole type, and so on), gas discoloration stabilizers (hydrazine type, and so on), hydrolysis inhibitors (carbodiimide type, and so on), metal deactivators, and the like either singly or in a combination of two or more thereof.

The above-described polyhydroxyurethane layer may be a resin layer with another resin blended to an extent that does not impair the barrier properties. Accordingly, a resin different from the polyhydroxyurethane resin may be contained in the coating composition according to the present invention. In this case, no particular limitation is imposed on the different resin, and usable examples include polyester-based elastomers, polyamide-based elastomers, styrene-based elastomers (SBS, SEBS, maleic acid-modified SEES, and the like), olefin-based elastomers (EPR, EPDM, and the like), styrene-based resins (PS, HIPS, AS, ABS, AES, and the like), chlorinated resins (PVC, chlorinated polyethylene, and the like) olefin-based resins (PE, PP, EVA, and the like), ester-based resins, amide-based resin, and so on.

The polyhydroxyurethane layer that characterizes the present invention may be one formed by using one of various crosslinking reactions that make use of some of hydroxyl groups or other chemical structures. Accordingly, such a crosslinking agent as will be described below may be added to the coating composition according to the present invention. As the crosslinking agent in this case, any crosslinking agent can be used insofar as it reacts with hydroxyl groups, and preferred examples include urea resins, melamine resins, epoxy resins, polyisocyanates, acid anhydrides, and the like.

The polyhydroxyurethane layer that makes up the gas barrier film according to the present invention may form a film as a single layer, or may be laminated on a base material or the like to provide a multilayer laminate. No particular limitation is imposed on the base material that makes up such a laminate. Illustrative are plastics, paper, fabrics, metals, ceramics, and the like. The coating composition according to the present invention can form a film, which has gas barrier properties, with good adhesiveness on a surface of such a base material.

When the base material is a resin film, no particular limitation is imposed on the kind of a usable resin, and high molecular materials, which have been conventionally used as packaging materials, are all usable. Examples include polyolefin resins such as polyethylene, polypropylene and polystyrene, polyester resins such as polyethylene terephthalate and polylactic acid, polyamide resins such as nylon 6 and nylon 66, copolymers of polyimides or the like and these resins, and the like. Additives, for example, such as known antistatic agents, ultraviolet absorbers, plasticizers, lubricants and colorants may be incorporated in these high molecular materials as needed. Such a resin film may be an unstretched film, a uniaxially or biaxially stretched (oriented) film, or one subjected to a surface treatment such as corona discharge treatment. Such a resin film may have a thickness of preferably 1 to 200 more preferably 5 to 150 µm. Such a resin film as a base material may be either a single-layer film or multilayer film, and a film with a metal such as aluminum or a metal oxide such as silica vapor-deposited thereon may also be used.

As a preferred production method of the gas barrier film according to the present invention, the below-described method can be mentioned. The coating composition according to the present invention, which contains the above-mentioned cyclic carbonate compound and amine compound as essential components, is applied to a surface of a base material or a surface of a release paper and heating may then be conducted as needed, whereby a polyhydroxyurethane layer can be readily formed as a gas barrier layer. In the foregoing, the application of the coating composition according to the present invention can be conducted by a known coating machine such as a gravure coater, knife coater, reverse coater, bar coater, spray coater, or slit coater, and as an alternative, a method that coats with a brush or spatula can also be used.

When the coating composition according to the present invention is applied to a base material or release paper as described above, the curing reaction between the carbonate compound and the amine compound proceeds even in a room-temperature state so that a polyhydroxyurethane layer is formed. After the application, heating may be conducted as needed. Therefore, heating may be conducted at 0° C. to 200° C. as preferred curing conditions, or a range of 60° C. to 120° C. as more preferred conditions.

As described above, the method of the present invention for the production of the gas barrier film can easily achieve the formation of a film by conducting heating under such conditions as described above even if no catalyst has been specifically added to the coating composition of the present invention to be used. It is, however, possible to incorporate a catalyst, which promotes the film forming reaction, in the coating composition as needed. Examples of a catalyst usable in such a case include basic catalysts such as triethylamine, tributylamine, diazabicycloundecene (DBU), triethylenediamine (DABCO) and pyridine, Lewis acid catalysts such as tetrabutyl tin and dibutyl tin laurate, and the like. These catalysts may be used preferably in an amount of 0.01 to 10 parts by mass relative to the total amount (100 parts by mass) of the carbonate compound and amine compound to be used.

By selecting liquid compounds as the carbonate compound and amine compound, the method of the present invention for the production of the gas barrier film can be conducted without addition of an organic solvent. However, an organic solvent may be incorporated as needed. Usable examples of the organic solvent include amide solvents such as N,N-dimethylformamide, dimethyl sulfoxide, dimethylacetamide and N-methyl-2-pyrrolidone, alcohol solvents such as methanol, ethanol, propanol, ethylene glycol and propylene glycol, and ether solvents such as ethylene glycol monomethyl ether, ethylene glycol dimethyl ether, propylene glycol methyl ether, diethylene glycol monomethyl ether, diethylene glycol dimethyl ether and tetrahydrofuran.

When it is difficult to form an even film due to a difference in surface tension between a used base material and a used film forming material upon obtaining a laminate in the method of the present invention for the production of the gas barrier film, the production can be conducted by adding a leveling material or defoaming agent. No particular limitation is imposed on the kind of such an additive. It can be used in any amount that does not impair the gas barrier properties. Preferably, it may be added in an amount of 1 to 10 mass % based on the mass of the polyhydroxyurethane resin.

[Second Aspect]

A description will next be made in detail about the second aspect of the present invention. The gas barrier film according to the present invention is characterized in that a layer with a specific polyhydroxyurethane resin contained therein is provided as at least one layer that makes up the film. The polyhydroxyurethane resin that characterizes the present invention has, as repeating units of a high molecular backbone thereof, at least one of chemical structures represented by the following formulas 2-1) to (2-4).

wherein Xs and Ys represent chemical structures formed of hydrocarbons or aromatic hydrocarbons derived from the monomer units, and the structures may each contain at least one of oxygen atoms, nitrogen atoms and sulfur atoms.

The resin has been obtained by using the compound A, which has at least two 5-membered cyclic carbonate groups (which will hereinafter be abbreviated simply as "the cyclic carbonate groups") in a molecule thereof, and the compound B, which has at least two amino groups in a molecule thereof, as monomer units and subjecting them to a polyaddition reaction. As a result of the foregoing, the resin has the above-described chemical structure as will be described below. First, in the reaction between the cyclic carbonate and the amine to form the high-molecular chain, two products of different structures are known to be obtained because the cleavage of the cyclic carbonate occurs in two ways as will be described below.

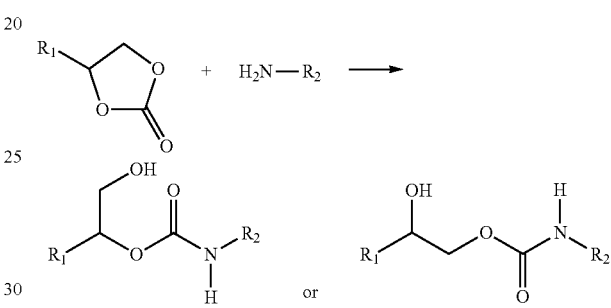

In the high molecular resin available from the below-described polyaddition reaction, four kinds of chemical structures of the following formulas (2-1) to (2-4) occur accordingly, and these chemical structures are considered to exist at random.

Formulas (2-1) to (2-4)

-continued

Formula (2-4)

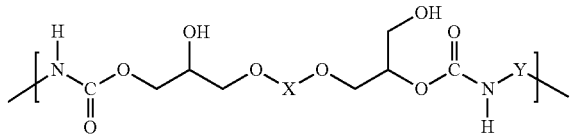

wherein Xs and Ys represent chemical structures formed of hydrocarbons or aromatic hydrocarbons derived from the monomer units, and the structures may each contain at least one of oxygen atoms, nitrogen atoms and sulfur atoms.

As described above, the polyhydroxyurethane resin that characterizes the present invention is characterized in that its backbone has the chemical structures each of which contains two urethane bonds and two hydroxyl groups. From an isocyanate compound and polyol compound in the production method of a polyurethane resin, said production method having been industrially employed to date, it is impossible to obtain a resin structure having hydroxyl groups on a backbone thereof. The polyhydroxyurethane resin having the above-described structures is a resin that has a novel structure clearly distinguishable from conventional polyurethane resins.

For the gas barrier properties of a resin, a structure that contains polar functional groups on its backbone is generally considered to be advantageous. In EVOH, for example, the hydroxyl groups on its backbone significantly contribute to the impartation of gas barrier properties. This is evident from the fact that polyethylene has no gas barrier properties although it is a resin structure similar to EVOH except for the deletion of the hydroxyl groups. In the present invention, it has been found for the first time that a film, which has a layer containing the polyhydroxyurethane resin (hereinafter called "the polyhydroxyurethane resin layer") as at least one of layers that make up the film, has gas barrier properties. From the foregoing too, the gas barrier properties are considered to be attributable to the possession of the chemical structure, which contains the hydroxyl groups introduced on the backbone, the polyhydroxyurethane resin.

The polyhydroxyurethane resin, which has the above-described structure and characterizes the present invention, may preferably have a weight average molecular weight of 10,000 to 100,000 from the standpoint of the strength and processability of the film. As mentioned above, it is considered that the number of hydroxyl groups contained in the resin structure is a factor which affects the gas barrier properties. The hydroxyl number (JIS K1557), which represents the content of hydroxyl groups in the resin, may be preferably in a range of 180 to 350 mgKOH/g, with a range of 270 to 350 mgKOH/g being more preferred. This hydroxyl number is determined by the molecular weights of a cyclic carbonate and amine compound as raw materials, and can be adjusted by choosing an appropriate combination from usable compounds to be described subsequently herein.

The performance of the gas barrier film according to the present invention may preferably be not higher than 50 mL/m$^2$·24 h·atm terms of oxygen permeation rate at a relative humidity of 90% or lower. The gas barrier properties become higher as the thickness of the polyhydroxyurethane resin layer increases, but become lower as the thickness of the polyhydroxyurethane resin layer decreases. As an excessively large thickness provides the film with a deteriorated texture, the thickness of the polyhydroxyurethane resin layer may preferably be in a range of 0.1 to 100 μm, with a range of 10 to 50 μm being more preferred.

The polyhydroxyurethane resin that characterizes the present invention is obtained from the cyclic carbonate compound and amine compound. The cyclic carbonate compound for use in this reaction may preferably be one obtained by a reaction between an epoxy compound and carbon dioxide. Described specifically, it is preferred to synthesize the polyhydroxyurethane resin, which characterizes the present invention, by using a cyclic carbonate compound which can be obtained as will be described below. For example, an epoxy compound as a raw material is reacted in the presence of a catalyst, at a temperature of 0° C. to 160° C., under a carbon dioxide atmosphere pressurized to atmospheric pressure to 1 MPa or so, for 4 to 24 hours. As a result, a cyclic carbonate compound with carbon dioxide fixed at ester moieties thereof can be obtained.

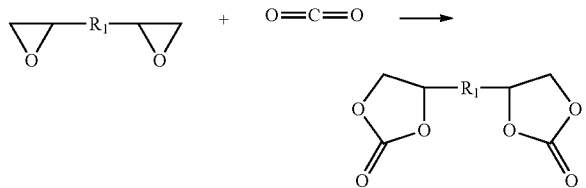

Owing to the use of the cyclic carbonate compound synthesized using carbon dioxide as a raw material as described above, the resultant polyurethane resin has, in its structure, —O—CO— bonds with carbon dioxide fixed therein. The content of —O—CO— bonds derived from carbon dioxide (the fixed amount of carbon dioxide) in the polyurethane resin may preferably be as high as possible from the standpoint of the effective use of carbon dioxide. The use of the above-described cyclic carbonate compound makes it possible to incorporate carbon dioxide, for example, in a range of 1 to 30 mass % in the structure of the polyhydroxyurethane resin for use in the present invention. In other words, it is meant that the above-described polyhydroxyurethane resin is a resin in which —O—CO— bonds derived from carbon dioxide as a raw material account for 1 to 30 masse of the mass of the resin.

As the catalyst for use in the above-mentioned reaction between the epoxy compound and carbon dioxide, a similar catalyst as mentioned above with respect to the first aspect can be used likewise. Further, the reaction between the epoxy compound and carbon dioxide can also be conducted in the presence of an organic solvent. As the organic solvent for use in this reaction, any organic solvent can be used insofar as it can dissolve the catalyst. Specifically, similar catalysts as mentioned above with respect to the first aspect can be used.

No particular limitation is imposed on the structure of the cyclic carbonate compound usable in the present invention, and therefore, any compound can be used insofar as it contains at least two cyclic carbonate structures in a molecule thereof. Usable skeleton, aromatic polycyclic skeleton or condensed polycyclic aromatic skeleton, and also cyclic carbonates of the aliphatic or alicyclic type. Usable compounds will hereinafter be exemplified.

As the cyclic carbonates having a benzene skeleton, aromatic polycyclic skeleton or condensed polycyclic aromatic skeleton, the following compounds are exemplified. In the following formulas, each R represents H or CH$_3$.

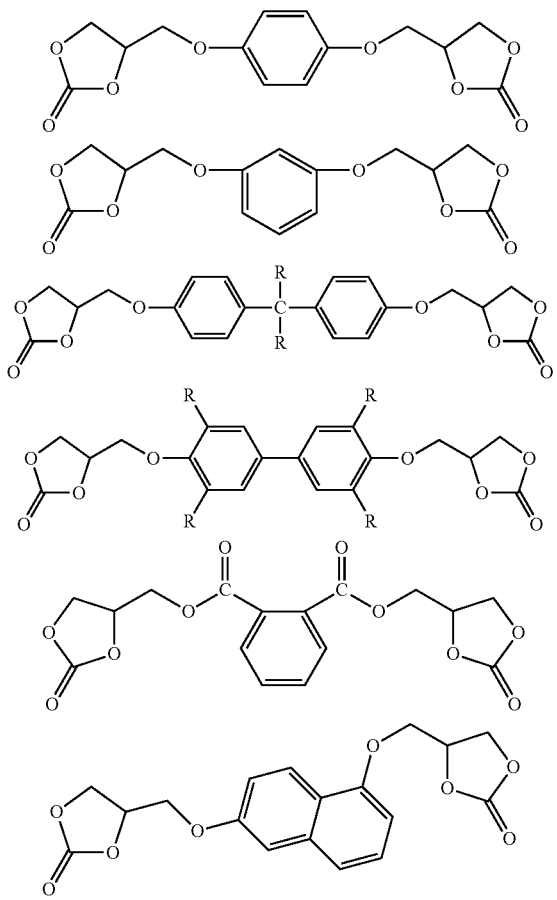

As the cyclic carbonates of the aliphatic or alicyclic type, the following compounds are exemplified. In the following formulas, each R represents H or $CH_2$.

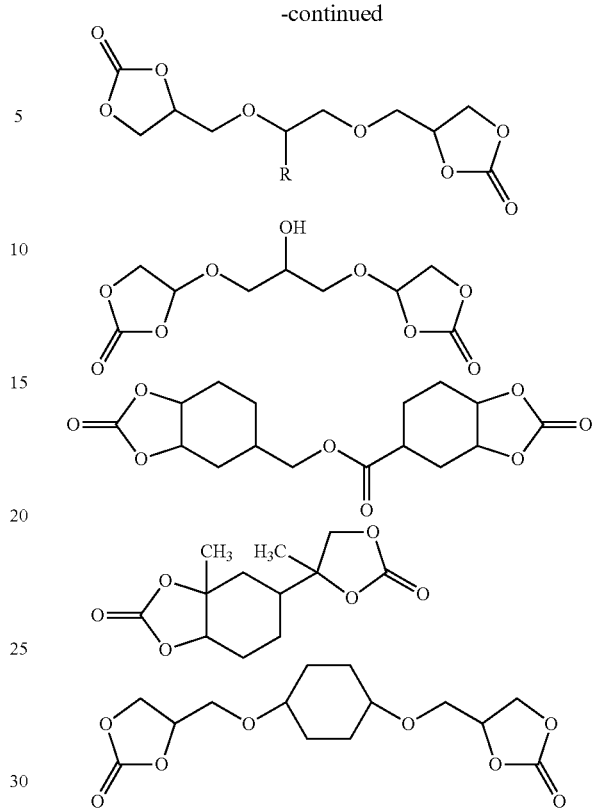

As polyfunctional amine compounds usable in the reactions with such cyclic carbonate compounds as mentioned above for the production of polyhydroxyurethane resins useful in the present invention, conventionally-known polyfunctional amine compounds are all usable. Preferred examples include linear aliphatic polyamines such as ethylenediamine, 1,3-diaminopropane, 1,4-diaminobutane, 1,6-diaminohexane, 1,8-diaminooctane, 1,10-diaminodecane and 1,12-diaminododecane, cyclic aliphatic polyamines such as isophoronediamine, norbornanediamine, 1,6-cyclohexanediamine, piperazine and 2,5-diaminopyridine, aliphatic polyamines having aromatic rings such as xylylenediamine, and aromatic polyamines such as methaphenylenediamine and diaminodiphenylmethane.

No particular limitation is imposed on the process for use in the present invention to produce the polyhydroxyurethane resin. For example, it can be obtained by such a process as will be described hereinafter. Described specifically, the polyhydroxyurethane resin can be obtained, for example, by mixing such a cyclic carbonate compound and amine compound as described above in the presence or absence of a solvent and reacting them at a temperature of 40 to 200° C. for 4 to 24 hours.

As the solvent for use in the production, any solvent can be used insofar as it is an organic solvent inert to the raw materials to be used and the polyhydroxyurethane resin to be obtained. Preferred examples include methyl ethyl ketone, methyl n-propyl ketone, methyl isobutyl ketone, diethyl ketone, methyl formate, ethyl formate, propyl formate, methyl acetate, ethyl acetate, butyl acetate, acetone, cyclohexanone, tetrahydrofuran, dioxane, toluene, xylene, dimethyl formamide, dimethyl sulfoxide, perchloroethylene, trichloroethylene, methanol, ethanol, propanol, ethylene glycol, propylene glycol, ethylene glycol monomethyl ether, ethylene glycol dimethyl ether, propylene glycol methyl ether, diethylene glycol monomethyl ether, diethylene glycol dimethyl ether, and the like.

The production of the polyhydroxyurethane resin for use in the present invention can be conducted without specifically using any catalyst as described above. To promote the reaction, however, it is possible to conduct the production in the presence of such a catalyst as will be mentioned below. Usable examples include basic catalysts such as triethylamine, tributylamine, diazabicycloundecene (DBU), triethylenediamine (DABCO) and pyridine, Lewis acid catalysts such as tetrabutyl tin and dibutyl tin laurate, and the like. Such a catalyst may be used preferably in an amount of 0.01 to 10 parts by mass relative to the total amount (100 parts by mass) of the carbonate compound and amine compound to be used.

To the polyhydroxyurethane resin for use in the present invention, additives may be added as needed. For example, anti-oxidants (hindered phenol type, phosphite type, thioether type, and so on), light stabilizers (hindered amine type, and so on) ultraviolet absorbers (benzophenone type, benzotriazole type, and so on), gas discoloration stabilizers (hydrazine type, and so on), hydrolysis inhibitors (carbodiimides, and so on), metal deactivators, and the like may be used either singly or in a combination of two or more thereof.

The polyhydroxyurethane resin that characterizes the present invention can be crosslinked, as needed, with one of various crosslinking agents by using some of hydroxyl groups contained in the structure of the resin upon formation of its film (resin layer). As the crosslinking agent, any crosslinking agent can be used insofar as it reacts with hydroxyl groups. Preferred examples include urea resins, melamine resins, epoxy resins, polyisocyanates, acid anhydrides, and the like.

The polyhydroxyurethane resin for use in the present invention, which has been produced as described above, has gas barrier properties even in the form of a single layer formed with the resin. The film according to the present invention may, therefore, be formed of a single layer. As an alternative, however, it may be provided as a multilayer film stacked in combination with one or more layers made of another resin. In the case of the multilayer film, the polyhydroxyurethane resin layer can be either an outer layer or an intermediate layer held between other resin layers, and can be provided as a gas barrier film no matter whether the polyhydroxyurethane resin layer is the outer layer or the intermediate layer.

To provide the multilayer film, no particular limitation is imposed on the resin usable as a forming material for another layer or other layers to be used in combination with the polyhydroxyurethane resin layer, and high molecular materials which have been conventionally used as packaging materials are all usable. Examples include polyolefin resins such as polyethylene, polypropylene and polystyrene, polyester resins such as polyethylene terephthalate and polylactic acid, polyamide resins such as nylon 6 and nylon 66, copolymers of polyimides or the like and these resins, and the like. Additives, for example, such as known antistatic agents, ultraviolet absorbers, plasticizers, lubricants and colorants may be incorporated in these high molecular materials as needed.

A description will next be made of a method according to the present invention for the production of the gas barrier film according to the present invention, in which the gas barrier film is produced by using the above-described polyhydroxyurethane resin that characterizes the present invention (hereinafter simply called "the polyhydroxyurethane resin"). Described specifically, the gas barrier film can be obtained by either a method that subjects the polyhydroxyurethane resin to melt forming or a method that forms a polyhydroxyurethane resin layer on a base material by coating the resin the form of a solution. In the melt forming method, a single-layer film can be obtained from the resin, for example, in a temperature range of 100 to 250° C. by the inflation method or T-die method. Upon obtaining a multilayer film, the following various methods can be used: a method that directly obtains a multilayer film from the polyhydroxyurethane resin and another resin by co-extrusion; a method that forms a polyhydroxyurethane resin layer on a layer made of another resin (hereinafter called "the layer of another resin") by melt lamination; and a method that conversely arranges the layer of another resin by melt lamination either above or each of above and below the polyurethane resin layer obtained as a single-layer film.

To obtain the film according to the present invention by arranging the polyhydroxyurethane resin layer on the base material by the coating method, a method such as that to be described hereinafter can be mentioned specifically. The film according to the present polyhydroxyurethane resin synthesized in a solvent usable for the above-mentioned production or a solution of the polyhydroxyurethane resin dissolved in such a solvent after its synthesis, applying it to a film as the base material by a gravure coater, knife coater, reverse coater, bar coater, spray coater, slit coater or the like, and allowing the solvent to evaporate.

To obtain the multilayer film, a resin film can be used as the layer of another resin to be stacked with the polyhydroxyurethane resin layer. The resin film may be an unstretched film, a uniaxially or biaxially stretched (oriented) film, or one subjected to a surface treatment such as corona discharge treatment. Such a resin film may have a thickness of preferably 1 to 200 μm, more preferably 5 to 150 μm. Such a resin film may be either a single-layer film or multilayer film, and a film with a metal such as aluminum or a metal oxide such as silica vapor-deposited thereon may also be used.

Gas barrier films according to the present invention obtainable as described above are useful, for example, as gas barrier packaging materials or wrapping films for various applications.

EXAMPLES

About the first aspect and second aspect of the present invention, a description will next be made more specifically based on their examples and comparative examples and production examples of resins used as specific forming components in the examples. It should, however, be borne in mind that the present invention shall not be limited to these examples. It should also be noted that the designations of "parts" and "%" in the following examples are on a mass basis unless otherwise specifically indicated.

First Aspect

A description will hereinafter be made about the examples and the like of the first aspect. First, a description will be made about methods for determining the "equivalent ratio of functional groups" and the "content of carbon dioxide in compound" specified in the first aspect.

[Equivalent Ratio of Functional Groups]

The "equivalent ratio of functional groups" of a cyclic carbonate compound to an amine compound in each of the reactions to be described hereinafter is a value calculated by using the following equation as will be described below.

Equivalent ratio of functional groups=(mass of the carbonate compound in the coating composition×number of functional groups in the carbonate compound÷molecular weight of the carbonate compound)/(mass of the amine compound in the coating composition×number of functional groups in the amine compound÷molecular weight of the amine compound)

The "number of functional groups in the carbonate compound÷molecular weight of the carbonate compound" needed with respect to the cyclic carbonate compound in the above-described calculation equation is an index that indicates the molar equivalent of carbonate groups per gram of the carbonate compound, and therefore, is defined as "carbonate equivalent" and was actually measured by a measuring method to be described subsequently herein, because a cyclic carbonate compound synthesized from an epoxy compound and carbon dioxide in each example was obtained as a mixture of cyclic carbonate compounds having different numbers of carbonate groups in a molecule. It is to be noted that the amine compound is free of such a problem and the molar equivalent of amino groups can be determined from the molecular weight of the amine compound.

A carbonate compound (1 g), the "carbonate equivalent" of which was to be measured, was dissolved in N,N-dimethylformamide (50 g). A solution (10 mL) of n-hexylamine (molecular weight: 101.19) in toluene, the concentration of which had been adjusted to 1 mol/L, was added, followed by a reaction at 60° C. for 10 hours. After the reaction, the solution was titrated to neutral with 0.5 N hydrochloric acid to quantify the amount of unreacted n-hexylamine. On the side, a blank titration was conducted without addition of the carbonate compound and the consumed amount of n-hexylamine was calculated back. The quotient obtained by dividing the consumed amount with the molecular weight of n-hexylamine was employed as the "carbonate equivalent" (unit: eq/g). In other words, the carbonate equivalent can be determined by [the amount of n-hexylamine (g) reacted with one (1) gram of the carbonate compound÷101.19 (unit eq/g)].

[Content of Carbon Dioxide in Compound]

As the —O—CO— bonds in the carbonate groups in the carbonate compound used in each example originated from carbon dioxide, the content of carbon dioxide in the carbonate compound can be calculated from the "carbonate equivalent" obtained as described above. Described specifically, the content of carbon dioxide (%) can be determined by [the carbonate equivalent (eq/g)×44 (the molecular weight of $CO_2$)×100]. Each content of carbon dioxide, which is to be described subsequently herein, was determined through a calculation in a manner as described above.

Production Example 1

Synthesis of a Compound (A-1) Having 5-Membered Cyclic Carbonate Groups

A p-aminophenol epoxy resin having an epoxy equivalent of 100 (trade name: "MY0510", product of Huntsman Advanced Materials L.L.C.; hereinafter abbreviated as "MY0510"; 100 parts), sodium iodide (product of Wako Pure Chemicals Industries, Ltd.; 20 parts), and N-methyl-2-pyrrolidone (150 parts) were charged in a reaction vessel equipped with a stirrer and an open reflux condenser. Carbon dioxide was next continuously bubbled under stirring at 100° C. for 10 hours to conduct a reaction. Subsequently, the resulting reaction mixture was diluted with ethyl acetate (200 parts). The diluted reaction mixture was transferred to a separation funnel, and then washed four times with brine to remove N-methyl-2-pyrrolidone and sodium iodide. After the washing, an ethyl acetate layer was transferred to an evaporator, and ethyl acetate was removed under reduced pressure. As a result, a clear liquid compound (97 parts) was obtained (yield: 72%).

Figure 1:
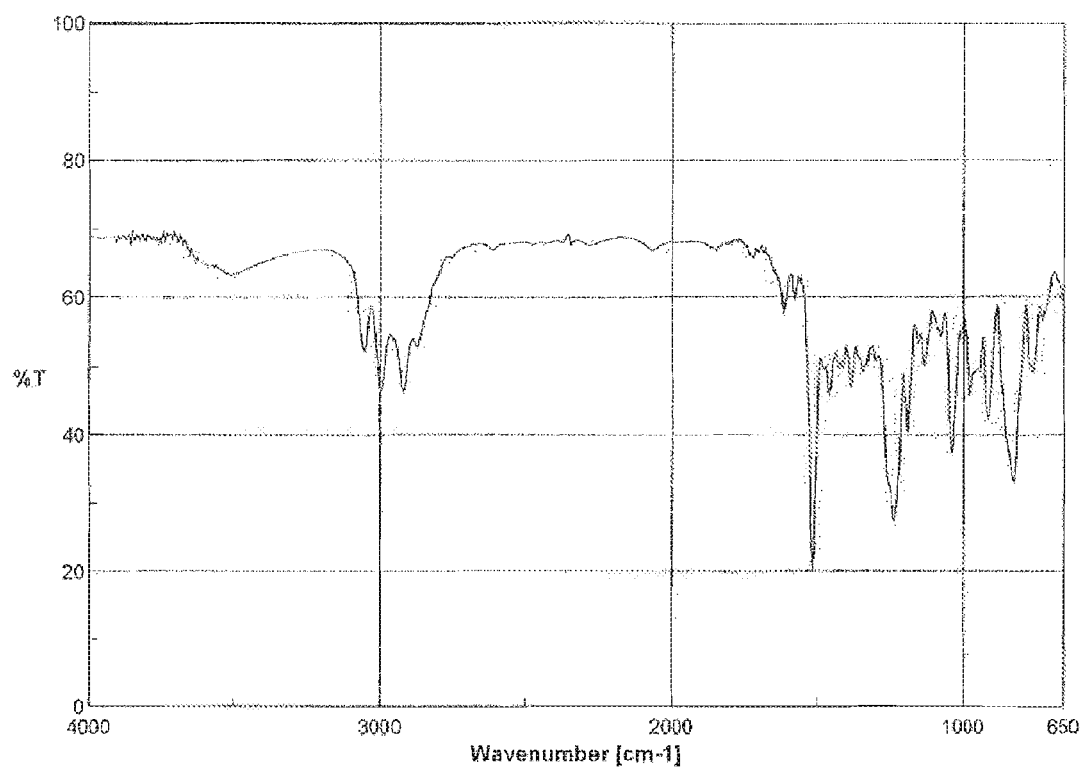
FIG. 1 is a diagram showing an IR spectrum of a raw material, "MY0510", used in Production Example 1.
Figure 2:
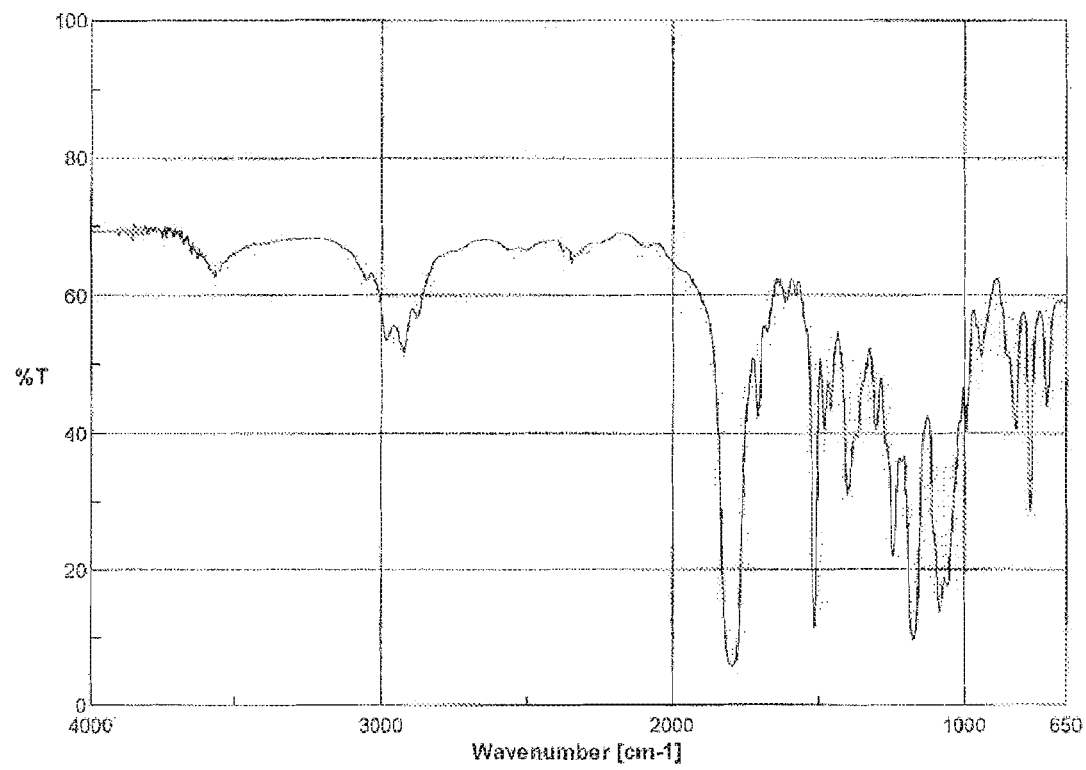
FIG. 2 is a diagram showing an IR spectrum of a substance, in other words, compound A-1 obtained in Production Example 1.
Figure 3:
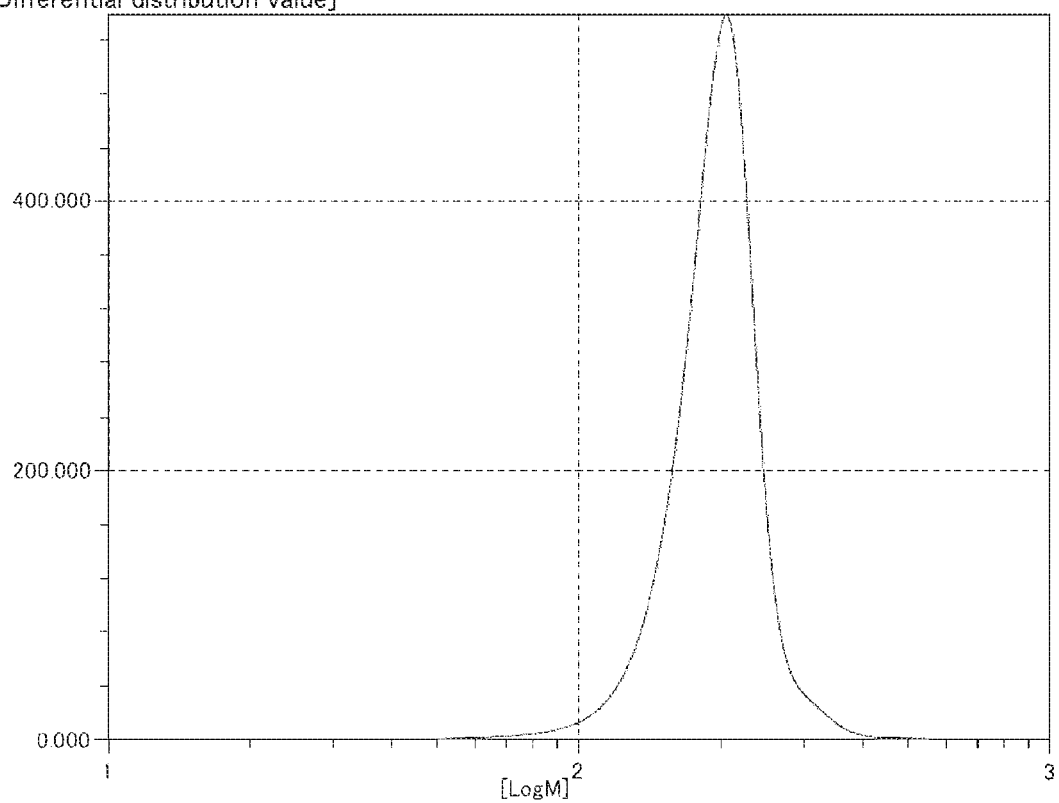
FIG. 3 is a diagram showing a differential molecular weight distribution of the raw material, "MY0510", used in Production Example 1.
Figure 4:
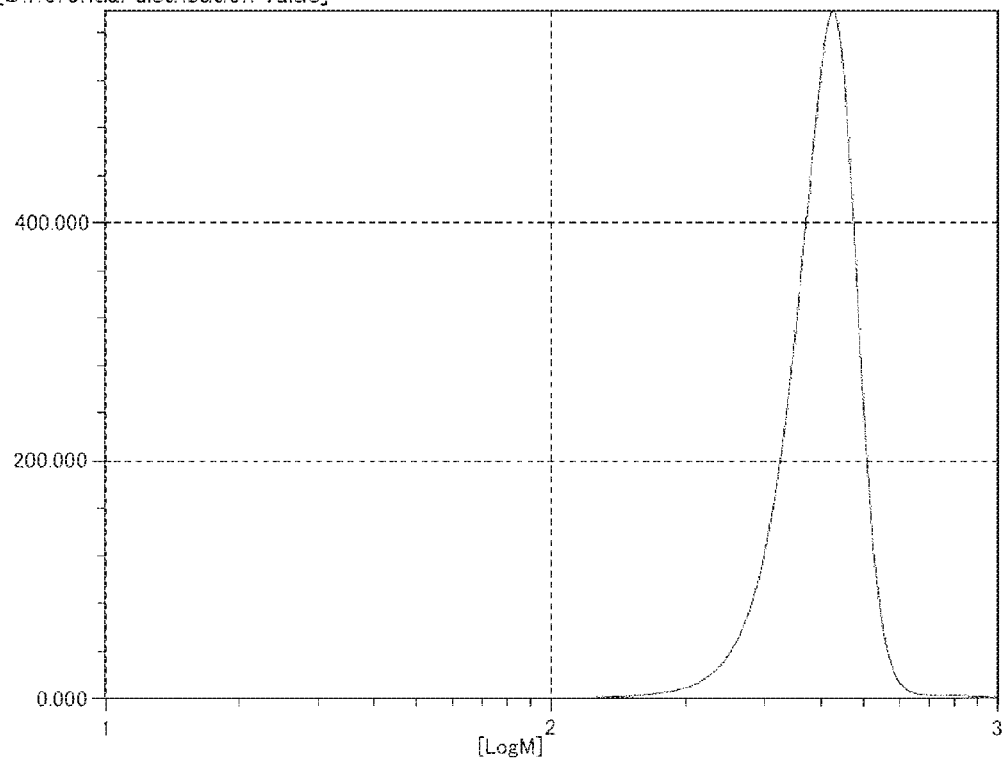
FIG. 4 is a diagram showing a differential molecular weight distribution of the substance obtained in Production Example 1.

When the thus-obtained compound was analyzed by an infrared spectrophotometer "FT/IR-350", manufactured by JASCO Corporation; this will apply equally to the subsequent production examples and examples; hereinafter abbreviated as "IR"), the peak around 910 $cm^{-1}$ derived from the epoxy groups of the raw material was no longer observed, but instead, a peak derived from the carbonyl groups of carbonate groups which did not exist in the raw material was confirmed around 1,800 $cm^{-1}$. An IR spectrum measured on "MY0510" used as the raw material is shown in FIG. 1, and an IR spectrum measured on the above-obtained substance is shown in FIG. 2. Further, as a result of a measurement by GPC ("GPC-8220" and "Column Super AW2500+AW3000AW4000+AW5000", manufactured by Tosoh Corporation; this will apply equally to the subsequent production examples and the like) making use of dimethylformamide (hereinafter abbreviated as "DMF") as a mobile phase, the weight average molecular weight of the above-obtained substance was found to be 404 (polyethylene oxide equivalent). A differential molecular weight distribution of "MY0510" used as the raw material is shown in FIG. 3, and a differential molecular weight distribution of the above-obtained substance is shown in FIG. 4.

From the foregoing, the above-obtained substance was confirmed to be a compound, which contained cyclic carbonate groups introduced therein by the reaction between epoxy groups and carbon dioxide and had a structure represented by the below-described formula. This compound will hereinafter be designated as "A-1". The carbonate equivalent of this compound A-1 was measured by the above-mentioned method, and as a result, was found to be 0.0069 eq/g. Segments derived from carbon dioxide were, therefore, calculated to account for 30.4% of the compound A-1.

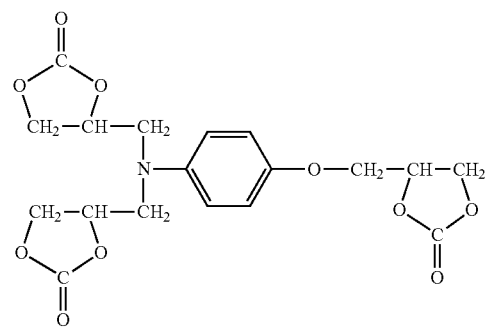

(A-1)

Production Example 2

Synthesis of a Compound (A-2) Having 5-Membered Cyclic Carbonate Groups

N,N,N',N'-Tetraglycidyl-1,3-benzenedi(methanamine) having an epoxy equivalent of 90 (trade name: "TETRAD- X"; product of Mitsubishi Gas Chemical Company, Inc.; 100 parts), sodium iodide (product of Wako Pure Chemicals Industries, Ltd.; 20 parts), and N-methyl-2-pyrrolidone (150 parts) were charged in a reaction vessel equipped with a stirrer and an open reflux condenser.

N,N,N',N'-Tetraglycidyl-1,3-benzenedi(methanamine) will hereinafter be called "tetraglycidylxylenediamine". Carbon dioxide was next continuously bubbled under stirring at 100° C. for 10 hours to conduct a reaction. After completion of the reaction, methyl ethyl ketone (hereinafter abbreviated as "MEK": 166 g) and toluene (83 g) were added to the solution, and an organic layer was taken out. The organic layer so taken out was transferred to a separation funnel, and then washed four times with brine to remove the catalyst. Further, the solvent was then allowed to evaporate by an evaporator to obtain an oily compound (125 g, yield: 84%).

When the thus-obtained compound was analyzed by IR, the peak around 910 cm$^{-1}$ derived from the epoxy groups of the raw material was no longer observed, but instead, a peak derived from the carbonyl groups of carbonate groups which did not exist in the raw material was confirmed around 1,800 cm$^{-1}$. Further, as a result of a measurement by GPC making use of DNF as a mobile phase, the weight average molecular weight of the above-obtained substance was found to be 594 (polyethylene oxide equivalent). From the foregoing, the above-obtained substance was confirmed to be a compound, which contained 5-membered cyclic carbonate groups introduced therein by the reaction between epoxy groups and carbon dioxide and had a structure represented by the below-described formula. This compound will hereinafter be designated as "A-2". The carbonate equivalent of this compound A-2 was measured by the above-mentioned method, and as a result, was found to be 0.0075 eq/g. Segments derived from carbon dioxide were, therefore, calculated to account for 33.0% of the chemical structure of the compound A-2.

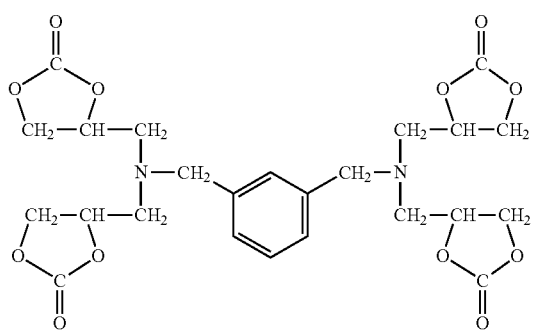

(A-2)

Production Example 3

Synthesis of a Compound (A-3) Having 5-Membered Cyclic Carbonate Groups

Glycerol polyglycidyl ether having an epoxy equivalent of 142 (trade name: "DENACOL EX-313"; product of Nagase Chemtex Corporation; 100 arts), sodium iodide (product of Wako Pure Chemicals Industries, Ltd.; 20 parts), and N-methyl-2-pyrrolidone (150 parts) were charged in a reaction vessel equipped with a stirrer and an open reflux condenser. Carbon dioxide was next continuously bubbled under stirring at 100° C. for 10 hours to conduct a reaction. After completion of the reaction, the solvent was allowed to evaporate by an evaporator to obtain an oily compound (132 parts, yield: 99.9%).

When the thus-obtained compound was analyzed by IR, the peak around 910 cm$^{-1}$ derived from the epoxy groups of the raw material was no longer observed, but instead, a peak derived from the carbonyl groups of carbonate groups which did not exist in the raw material was confirmed around 1,800 cm$^{-1}$. Further, as a result of a measurement by GPC making use of DMF as a mobile phase, the weight average molecular weight of the above-obtained substance was found to be 397 (polyethylene oxide equivalent). From the foregoing, the above-obtained substance was confirmed to be a compound, which contained 5-membered cyclic carbonate groups introduced therein by the reaction between epoxy groups and carbon dioxide and had a structure represented by the below-described formula. This compound will hereinafter be designated as "A-3". The carbonate equivalent of this compound A-3 was measured by the above-mentioned method, and as a result, was found to be 0.0054 eq/g. Segments derived from carbon dioxide were, therefore, calculated to account for 23.8% of the compound A-3.

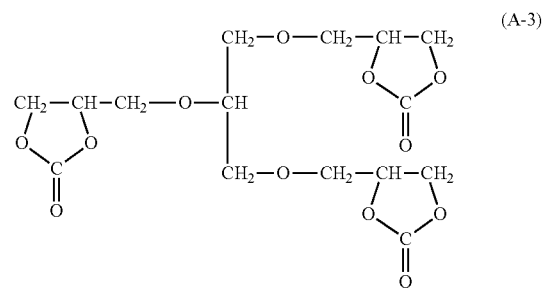 [SMILES: O=C1OCC(COCC(COCC2COC(=O)O2)OCC2COC(=O)O2)O1]

(A-3)

Example 1

Prepared was a solution containing the compound A-1 obtained in Production Example 1 (100.0 parts), meta-xylylenediamine (product of Mitsubishi Gas Chemical Company, Inc.; abbreviated as "MXDA" in a table to be described subsequently herein; 45.6 parts) and ethyl acetate (145.5 parts). A surface control agent (trade name: "BYK349", product of BYK-Chemie GmbH; 0.7 parts) was added, followed by thorough stirring to obtain a coating solution as a coating composition of this example. The solution was applied to a release paper by a bar coater (No. 30). Subsequently, the applied coated solution was subjected to a curing reaction at 80° C. for 12 hours so that a single-layer film was formed from the coating solution. The thus-obtained film was transparent, and its thickness was 20 μm. The film so obtained was confirmed to exhibit good gas barrier properties as will be mentioned subsequently herein. Segments derived from carbon dioxide accounted for 21.0% (calculated value) of the polyhydroxyurethane resin which made up the film. The equivalent ratio of functional groups of the carbonate compound to the amine compound in the above-described reaction was 1.0.

Example 2

A coating solution was prepared as a coating composition of this example by combining and thoroughly stirring the compound A-2 obtained in Production Example 2 (100.0 parts), meta-xylylendiamine (product of Mitsubishi Gas Chemical Company, Inc.; 51.0 parts) and a surface control agent ("BYK349", product of BYK-Chemie GmbH; 0.8 parts). The solution was applied to a release paper by a bar coater (No. 15), and in a similar manner as in Example 1, a single-layer film was formed from the coating solution. The film was transparent, and its thickness was 20 μm. Segments derived from carbon dioxide accounted for 21.7% (calculated value) of the barrier coating film. The equivalent ratio of functional groups of the carbonate compound to the amine compound in the above-described reaction was 1.0.

Example 3

A coating solution was prepared as a coating composition of this example by combining and thoroughly stirring the compound A-2 obtained in Production Example 2 (100.0 parts), 1,3-bisaminomethylcyclohexane (product of Mitsubishi Gas Chemical Company, Inc.; abbreviated as "13BAC" in the table to be described subsequently herein; 53.0 parts), and a surface control agent (trade name: "BYK349", product of BYK-Chemie GmbH; 0.8 parts). The solution was applied to a release paper by a bar coater (No. 15), and as in Example 1, a single-layer film was formed from the coating solution. The film was transparent, and its thickness was 20 μm Segments derived from carbon dioxide accounted for 21.4% (calculated value) of the barrier coating film. The equivalent ratio of functional groups of the carbonate compound to the amine compound in the above-described reaction was 1.0.

Example 4

Prepared was a solution containing the compound A-3 obtained in Production Example 3 (100.0 parts), meta-xylylendiamine (product of Mitsubishi Gas Chemical Company, Inc.; 36.7 parts) and ethyl acetate (136.7 parts). A surface control agent (trade name: "BYK349", product of BYK-Chemie GmbH; 0.7 parts) was added, followed by thorough stirring to obtain a coating solution as a coating composition of this example. As in Example 1, the solution was applied to a release paper to form a single-layer film from the coating solution. The film was transparent, and its thickness was 20 μm. Segments derived from carbon dioxide accounted for 17.3% (calculated value) of the barrier coating film. The equivalent ratio of functional groups of the carbonate compound to the amine compound in the above-described reaction was 1.0.

Example 5

Prepared was a solution containing the compound A-2 obtained in Production Example 2 (100.0 parts), meta-xylylenediamine (product of Mitsubishi Gas Chemical Company, Inc.; 35.7 parts), hexamethylenediamine (product of Asahi Kasei Corporation; abbreviated as "HMDA" in the table to be described subsequently herein; 13.0 parts) and ethyl acetate (148.7 parts). A surface control agent (trade name: "BYK349", product of BYK-Chemie GmbH; 0.7 parts) was added, followed by thorough stirring to obtain a coating solution as a coating composition of this example. As in Example 1, the solution was applied to a release paper to form a single-layer film from the coating solution. The film was transparent, and its thickness was 20 μm. Segments derived from carbon dioxide accounted for 22.1% (calculated value) of the barrier coating film. The equivalent ratio of functional groups of the carbonate compound to the amine compound in the above-described reaction was 1.0.

Example 6

A solution was prepared by adding, to a mixture of the compound A-2 obtained in Production Example 2 (50.0 parts) and meta-xylylenediamine (product of Mitsubishi Gas Chemical Company, Inc.; 25.4 parts), tetraglycidylxylenediamine having an epoxy equivalent of 90 (trade name: "TETRAD-X", product of Mitsubishi Gas Chemical Company, Inc.; 50.0 parts), meta-xylylenediamine (product of Mitsubishi Gas Chemical Company, Inc.; 18.9 parts), and ethyl acetate (163.5 parts). Further, a surface control agent ("BYK349", product of BYK-Chemie GmbH; 0.8 parts) was added, followed by thorough stirring to obtain a coating solution as a coating composition of this example. As in Example 1, the solution was applied to a release paper to form a single-layer film from the coating solution. The film so obtained was transparent, and its thickness was 20 μm. Segments derived from carbon dioxide accounted for 11.3% (calculated value) of the barrier coating film. The equivalent ratio of functional groups of the carbonate compound to the amine compound in the above-described reaction was 1.01.

Example 7

A film (barrier layer) was formed in a similar manner as in Example 1 except that the base material was changed from the release paper to a PET film of 23 μm thickness (trade name: "LUMIRROR", product of Toray Industries, Inc.; oxygen permeation rate: 71.3 mL/m$^2$·24 h·atm at 23° C. and 35%, 53.5 mL/m$^2$·24 h·atm at 23° C. and 65%, 50.2 mL/m$^2$·24 h·atm at 23° C. and 90%) to obtain a composite film. The film so obtained was transparent, and the thickness of the barrier layer formed on the base material was 20 μm.

Example 8

A film (barrier layer) was formed in a similar manner as in Example 1 except that the base material was changed from the release paper to a stretched polypropylene film of 60 μm thickness (trade name: "TORAYFAN", product of Toray Industries, Inc.; oxygen permeation rate: 641.5 mL/m$^2$·24 h·atm at 23° C. and 35%, 555.2 mL/m$^2$·24 h·atm at 23° C. and 65%, 542.2 m/L/m$^2$·24 h·atm at 23° C. and 90%; abbreviated as "OPP" in the table to be described subsequently herein) to obtain a composite film. The film so obtained was transparent, and the thickness of the barrier layer formed on the base material was 20 μm.

Comparative Example 1

A coating solution was obtained by combining and thoroughly stirring tetraglycidylxylenediamine having an epoxy equivalent of 90 (trade name: "TETRAD-X", product of Mitsubishi Gas Chemical Company, Inc.; 100.0 parts), meta-xylenediamine (product of Mitsubishi Gas Chemical Company, Inc.; 76.0 parts), and a surface control agent ("BYK349", product of BYK-Chemie GmbH; 0.9 parts). In an attempt to form a cured coating film, the solution so obtained was applied to a release paper as in Example 1. However, the resulting film was hard and brittle, and cracked before measurement. Therefore, measurement of its oxygen permeation rate was not feasible.

Comparative Example 2

A solution was prepared with tetraglycidylxylenediamine having an epoxy equivalent of 90 (trade name: "TETRAD- X", product of Mitsubishi Gas Chemical Company, Inc.; 100.0 parts), meta-xylenediamine (product of Mitsubishi Gas Chemical Company, Inc.; 76.0 parts), and ethyl acetate (176.0 parts) contained therein. A surface control agent ("BYK349", product of BYK-Chemie GmbH; 0.9 parts) was added, followed by thorough stirring to obtain a coating solution. To a similar PET film of 23 μm thickness as that used in Example 7, the solution was applied by a bar coater (No. 30). The applied coating solution was subjected to a curing reaction at 80° C. for 12 hours so that a single-layer film was formed. The film was pale yellow and transparent, and the thickness of the barrier layer was 20 μm.

Comparative Example 3

A solution was prepared with glycerol polyglycidyl ether having an epoxy equivalent of 142 (trade name: "DENA-COL EX-313"; product of Nagase Chemtex Corporation; 100.0 parts), meta-xylylenediamine (product of Mitsubishi Gas Chemical Company, Inc.; 48.2 parts), and ethyl acetate (148.2 parts) contained therein. A surface control agent ("BYK349", product of BYK-Chemie GmbH; 0.7 parts) was added, followed by thorough stirring to obtain a coating solution. To a similar PET film of 23 μm thickness as that used in Example 7, the solution was applied by a bar coater (No. 30). The applied coating solution was subjected to a curing reaction at 80° C. for 12 hours so that a single-layer film was formed. The film was pale yellow and transparent, and the thickness of the barrier layer was 20 μm.

Comparative Example 4

A film was formed in a similar manner as in Comparative Example 2 except that the base material was changed from the PET film to a stretched polypropylene film of 60 μm thickness (trade name: "TORAYFAN", product of Foray Industries, Inc.). The film was pale yellow and transparent, and the thickness of the barrier layer was 20 μm.

Comparative Example 5

A film was formed in a similar manner as in Comparative Example 3 except that the base material was changed from the PET film to a stretched polypropylene film of 60 μm thickness (trade name: "TORAYFAN", product of Toray Industries, Inc.). The film was pale yellow and transparent, and the thickness of the barrier layer was 20 μm.

The formulas of the coating solutions in the above-described preparation examples and comparative examples are summarized in Table 1.

TABLE 1

Formulas of Coating Solutions in Examples and Comparative Examples

| | Carbonate compound or epoxy resin | Amine | Involatiles | Kind of base material |
|---|---|---|---|---|
| Ex. 1 | A-1 | MXDA | 50% | — |
| Ex. 2 | A-2 | MXDA | 100% | — |
| Ex. 3 | A-2 | 13BAC | 100% | — |
| Ex. 4 | A-3 | MXDA | 50% | — |
| Ex. 5 | A-2 | HMDA/ MXDA = 30/70 | 50% | — |
| Ex. 6 | A-2/ "TETRAD-X" = 50/50 | MXDA | 50% | — |
| Ex. 7 | A-1 | MXDA | 50% | PET (23 μm) |
| Ex. 8 | A-1 | MXDA | 50% | OPP (60 μm) |
| Comp. Ex. 1 | "TETRAD-X" | MXDA | 100% | — |
| Comp. Ex. 2 | "TETRAD-X" | MXDA | 50% | PET (23 μm) |
| Comp. Ex. 3 | "EX-313" | MXDA | 50% | PET (23 μm) |
| Comp. Ex. 4 | "TETRAD-X" | MXDA | 50% | OPP (60 μm) |
| Comp. Ex. 5 | "EX-313" | MXDA | 50% | OPP (60 μm) |

"TETRAD-X": tetraglycidylxylenediamine
"EX-313": glycerol polyglycidyl ether
MXDA: meta-xylylenediamine
13BAC: 1,3-bisaminomethylcyclohexane
HMDA: hexamethylenediamine Evaluation With respect to the respective films (specifically, barrier films) obtained in the examples and comparative examples, evaluations were performed according to the following methods and standards. The evaluation results are summarized in Table 2.

[Content of Carbon Dioxide]

The content of carbon dioxide was determined by calculating the mass % of segments, which had been derived from carbon dioxide as a raw material, in the chemical structure of the barrier film obtained by applying each coating solution. Described specifically, the contents of carbon dioxide were indicated by values as calculated from the theoretical amounts of carbon dioxide contained in the monomers used upon synthesis of the compounds A-1 to A-3 in the respective production examples. In the case of Example 1, for example, the segments derived from carbon dioxide accounted for 30.4% of the used compound A-1. Therefore, the content of carbon dioxide in the polyhydroxyurethane of Example 1 was (100 parts×30.4%)/total amount, 145.6 parts=20.9 mass %.

[Measurement Method of Oxygen Permeation Rate]

Using an oxygen permeation rate analyzer ("OX-TRAN2/21HL", manufactured by Modern Controls Incorporated), the oxygen permeation rate of each film was measured at 23° C. under relative humidity conditions of 35%, 65% and 90%, and the oxygen permeation rate P of the barrier layer in the formed film was calculated by using the following equation (1).

$$1/R1 = 1/R2 + 1/P \quad (1)$$

The signs in the above-described equation (1) have the following meanings:

R1: oxygen permeation rate (mL/m$^2$·day·MPa) of a plastic film with a coating applied thereto, R2: oxygen permeation rate (mL/m$^2$·day·MPa) of a film as a base material, and P: oxygen permeation rate (mL/m$^2$·day·MPa) of a barrier layer.

[Adhesiveness Between Coating Film and Base Material]

In each coating film, 100 cross-cuts of 1 mm$^2$ each were formed. After a cellophane tape (product of Nichiban Co., Ltd.) was strongly pressed against the cross-cuts by a finger, the cellophane tape was quickly peeled off in a direction of 90 degrees. Based on the number of the remaining cross-cuts, the adhesiveness was evaluated in 4 stages (A: 100, B: 80 to 99, C: 50 to 79, D: 0 to 49). Ranks A and B were determined to be good in adhesiveness.

TABLE 2

| | Kind and thickness of base material | Barrier layer (μm) | Oxygen permeation rate* | | | $CO_2$ content (%) | Adhesiveness |
|---|---|---|---|---|---|---|---|
| | | | 35% RH | 65% RH | 90% RH | | |
| Ex. 1 | — | 20 | 0.2 | 0.4 | 0.7 | 20.9 | — |
| Ex. 2 | — | 20 | 0.3 | 0.7 | 1.0 | 21.9 | — |
| Ex. 3 | — | 20 | 1.0 | 2.4 | 4.1 | 21.6 | — |
| Ex. 4 | — | 20 | 2.6 | 12.9 | 20.7 | 17.4 | — |
| Ex. 5 | — | 20 | 5.1 | 25.5 | 31.4 | 22.2 | — |
| Ex. 6 | — | 20 | 0.4 | 1.1 | 1.9 | 11.4 | — |
| Ex. 7 | PET (23 μm) | 20 | 0.2 | 0.5 | 0.9 | 20.9 | A |
| Ex. 8 | OPP (60 μm) | 20 | 0.3 | 0.8 | 1.1 | 20.9 | A |
| Comp. Ex. 1 | — | — | Unmeasurable | Unmeasurable | Unmeasurable | — | — |
| Comp. Ex. 2 | PET (23 μm) | 20 | 0.6 | 2.0 | 3.3 | 0.0 | D |
| Comp. Ex. 3 | PET (23 μm) | 20 | 7.7 | 33.7 | 50.6 | 0.0 | D |
| Comp. Ex. 4 | OPP (60 μm) | 20 | 0.7 | 2.1 | 3.8 | 0.0 | D |
| Comp. Ex. 5 | OPP (60 μm) | 20 | 8.0 | 35.0 | 53.9 | 0.0 | D |

*Oxygen permeation rate (mL/m$^2$ · 24 h · atm)

As is evident from Table 2, the films of the examples were confirmed to be low in oxygen permeation rate at each of the humidities and to have excellent gas barrier properties. Compared with the comparative examples in which the epoxy resins were used in the barrier layers, respectively, the resulting films were confirmed to be usable as single-layer films owing to the possession of flexibility and also to be readily usable as multilayer barrier materials owing to the excellent adhesion properties to other base materials. This means that the production methods of the examples are simple as production methods upon production of multilayer materials of excellent gas barrier properties. As shown in Table 2, it is the largest characteristic of the present invention that a urethane resin, which is generally excellent in adhesive force but is poor in gas barrier properties, is equipped with gas barrier properties. Such a pronounced advantageous effect has been brought about for the first time by the polyhydroxyurethane resin, which is an essential component in the present invention and is obtainable from the cyclic carbonate compound and the amine compound.

Further, the carbonate compound as an essential component in the coating composition according to the present invention contains carbon dioxide fixed at a content as segments of the chemical structure, so that the resulting film is also a film with carbon dioxide fixed therein. This substantiates that the material provided by the present invention is industrially useful as a gas barrier film which can accommodate environmental problems.

Second Aspect

A description will hereinafter be made about examples and the e of the second aspect. The method for determining the "content of carbon dioxide" specified in the second aspect is similar to that described in connection with the first aspect.

Production Example 2-1

Synthesis of Cyclic Carbonate-Containing Compound (I-A)

Bisphenol A diglycidyl ether having an epoxy equivalent of 192 (trade name: "jER828", product of Japan Epoxy Resin Co., Ltd.; 100 parts), sodium iodide (product of Wako Pure Chemicals Industries, Ltd.; 20 parts), and N-methyl-2-pyrrolidone (100 parts) were charged in a reaction vessel equipped with a stirrer and an open reflux condenser. Carbon dioxide was next continuously bubbled under stirring at 100° C. for 10 hours to conduct a reaction. After completion of the reaction, isopropanol (1,400 parts) was added to the reaction mixture, and the reaction product was separated out as a white precipitate. The precipitate was collected by filtration. The precipitate so obtained was recrystallized from toluene to obtain a white powder (52 parts, yield: 42).

When the above-obtained powder was analyzed by IR ("FT-720", manufactured by Horiba, Ltd.; this will apply equally to the subsequent production examples and examples), the absorption around 910 cm$^{-1}$ derived from the epoxy groups of the raw material was no longer observed, but instead, an absorption derived from the carbonyl groups of carbonate groups which did not exist in the raw material was confirmed around 1,800 cm$^{-1}$. Further, as a result of an analysis by HPLC ("LC-2000", manufactured by JASCO Corporation; column: "FinepakSIL C18-T5": mobile phase: acetonitrile+water), the peaks of the raw materials were no longer observed, but instead, a new peak appeared on a high polarity side and its purity was 98%. Furthermore, as a result of a DSC measurement (differential scanning calorimetric measurement), the melting point was 178° C., and the melting point range was ±5° C. From the foregoing, the powder was confirmed to be a compound, which contained cyclic carbonate groups introduced therein by the reaction between epoxy groups and carbon dioxide and had a structure represented the below-described formula. This compound will hereinafter be designated as "I-A". Segments derived from carbon dioxide accounted for 20.5% of the chemical structure of the compound I-A (calculated value)

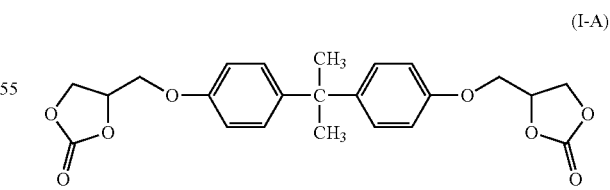

(I-A)

Production Example 2-2

Synthesis of a Cyclic Carbonate-Containing Compound (I-B)

A cyclic carbonate compound (I-B) of a structure represented by the below-described formula was synthesized in a similar manner as in Production Example 1 except that hydroquinone diglycidyl ether having an epoxy equivalent of 115 (trade name: "DENACOL EX203", product of Nagase Chemtex Corporation) was used as an epoxy compound. The compound I-B so obtained was white crystals, its melting point was 141° C., and its yield was 55%. The results of its IR analysis were similar to those of the compound I-A, and its purity by HPLC analysis was 97%. Segments derived from carbon dioxide accounted for 28.0% of the chemical structure of the compound I-B (calculated value).

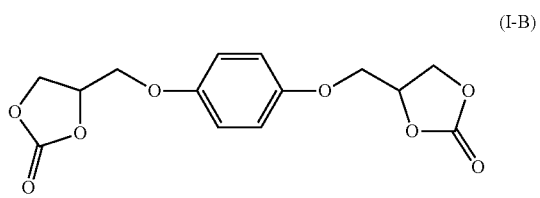 [SMILES: O=C1OCC(COc2ccc(OCC3COC(=O)O3)cc2)O1]

(I-B)

Production Example 2-3

Synthesis of a Cyclic Carbonate-Containing Compound (I-C)

Neopentyl glycol diglycidyl ether having an epoxy equivalent of 138 (trade name: "DENACOL EX-211", product of Nagase Chemtex Corporation; 100 arts), sodium iodide (product of Wako Pure Chemicals Industries, Ltd.; 20 parts), and N-methyl-2-pyrrolidone (100 parts) were charged in a reaction vessel equipped with a stirrer and an open reflux condenser. Carbon dioxide was next continuously bubbled under stirring at 100° C. for 10 hours to conduct a reaction. After completion of the reaction, the reaction mixture was poured into distilled water (1,000 mL), and a settled pale yellow liquid substance was collected. Subsequently, the thus-collected liquid substance was dried in an oven to obtain a cyclic carbonate compound (I-C) represented by the below-described formula. Its yield was 92%. The results of its IR analysis were similar to those of the compound I-A, and its purity by HPLC analysis was 97%. Segments derived from carbon dioxide accounted for 24.2% of the chemical structure of the compound (calculated value).

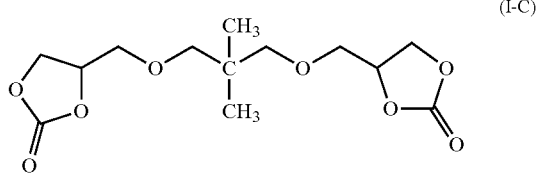 [SMILES: CC(C)(COCC1COC(=O)O1)COCC1COC(=O)O1]

(I-C)

Production Example 2-4

Synthesis of a Cyclic Carbonate Compound (I-D)

Ethylene glycol diglycidyl ether having an epoxy equivalent of 113 (trade name: "DENACOL EX-810", product of Nagase Chemtex Corporation; 100 parts), sodium iodide (product of Wako Pure Chemicals Industries, Ltd.; 20 parts), and N-methyl-2-pyrrolidone (100 parts) were charged in a reaction vessel equipped with a stirrer and an open reflux condenser. Carbon dioxide was next continuously bubbled under stirring at 100° C. for 10 hours to conduct a reaction. After completion of the reaction, the reaction mixture was diluted with ethyl acetate (200 parts). The diluted reaction mixture was transferred to a separation funnel, and then washed four times with brine to remove N-methyl-2-pyrrolidone and sodium iodide. Subsequently, an ethyl acetate layer was transferred to an evaporator, and ethyl acetate was distilled off under reduced pressure. As a clear oily substance, a cyclic carbonate compound (1-D) represented by the below-described formula was obtained. Its yield was 69%, the results of its IR analysis were similar to those of the compound I-A, and its purity by HPLC analysis was 95%. Segments derived from carbon dioxide accounted for 33.6% of the chemical structure of the compound I-D (calculated value).

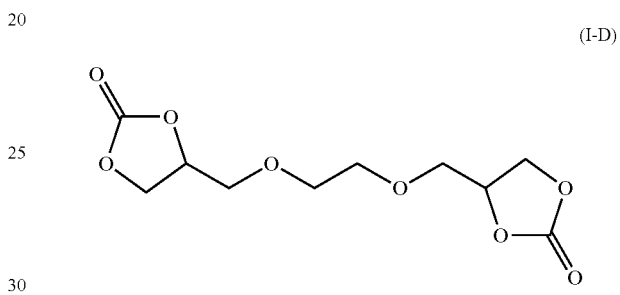

(I-D)

Example 2-1

Charged into a reaction vessel equipped with a stirrer and an open reflux condenser were the compound. I-A (100 parts) obtained in Production Example 2-1, hexamethylenediamine (product of Asahi Kasei Chemicals Corporation; 27.1 parts), and further, N,N-dimethylformamide (127 parts) as a reaction solvent. Under stirring at a temperature of 100° C., a reaction was conducted for 24 hours. After the reaction, the reaction mixture was poured into methanol to separate out the reaction product. The reaction product was collected by filtration, and was then dried at 80° C. for 24 hours to obtain a polyurethane resin. When the thus-obtained resin was analyzed by IR, an absorption derived from the carbonyl groups of urethane bonds was confirmed around 1,760 cm$^{-1}$. From the results or $^1$H-NMR analysis (an instrument manufactured by Bruker BioSpin GmbH, solvent: DMSO-d$_6$, temperature: 120° C., internal standard: TMS), the existence of both of the two types of bonds derived from the two types of cleavage of the cyclic carbonate in the cyclic carbonate and the amine was confirmed. It was, therefore, possible to confirm that a polyhydroxyurethane resin of the intended structure had been successfully synthesized. The hydroxyl number of the resin so obtained was 204 mgKOH/g. Further, the weight average molecular weight of the resin was found to be 43,000 (polystyrene equivalent) by GPC measurement ("GPC-8220" and "Column Super AW2500+AW3000+AW4000+AW5000", manufactured by Tosoh Corporation; this will apply equally to the subsequent examples) making use of DMF as a mobile phase. An IR spectrum of the above-obtained polyhydroxyurethane resin is shown in FIG. 5. In addition, an NMR chart of the resin is shown in FIG. 6, and a GPC elution curve of the resin is shown in FIG. 7.

From the resin obtained as described above, a 50-μm thick single-layer film of the polyhydroxyurethane resin was formed by a 20-mm diameter, single screw extruder, which was fitted with a T-die, under conditions of a cylinder temperature of 160° C., a roll temperature of 30° C. and a take-up rate of 1 m/min.

Example 2-2

A polyurethane resin was obtained by using the compound I-A (100 parts) obtained in Production Example 2-1, 1,3-diaminopropane (product of Koei Chemical Company Limited; 17.3 parts) and N,N-dimethylformamide 17 parts) and reacting them as to Example 2-1. The results of IR analysis of the thus-obtained resin were similar to those of Example 2-1, the hydroxyl number of the resin was 221 mgKOH/g, and the weight average molecular weight of the resin by GPC measurement was 42,000 (polystyrene equivalent). From the resin so obtained, a 50-μm thick single-layer film of the polyhydroxyurethane resin was formed by a similar machine and under similar conditions as in Example 2-1.

Example 2-3

A polyurethane resin was obtained by using the compound I-A (100 parts) obtained in Production Example 2-1, meta-xylylendiamine (product of Mitsubishi Gas Company, Inc.; 31.8 parts) and N,N-dimethylformamide (132 parts) and reacting them as in Example 2-1. The results of IR analysis of the thus-obtained resin were similar to those of Example 2-1, the hydroxyl number of the resin was 195 mgKOH/g, and the weight average molecular weight of the resin by GPC measurement was 31,000 (polystyrene equivalent). From the resin so obtained, a 50 μm thick single-layer film of the polyhydroxyurethane resin was formed by a similar machine and under similar conditions as in Example 2-1.

Example 2-4

A polyurethane resin was obtained by using the compound I-B (100 parts) obtained in Production Example 2-2, hexamethylenediamine (product of Asahi Kasei Chemicals Corporation; 37 parts) and N,N-dimethylformamide (137 parts) and reacting them as in Example 2-1. The results of IR analysis of the thus-obtained resin were similar to those of Example 2-1, the hydroxyl number of the resin was 258 mgKOH/g, and the weight average molecular weight of the resin by GPC measurement was 35,000 (polystyrene equivalent). From the resin so obtained, a 50-μm thick single-layer film of the polyhydroxyurethane resin was formed by a similar machine and under similar conditions as in Example 2-1.

Example 2-5

A polyurethane resin was obtained by using the compound I-B (100 parts) obtained in Production Example 2-2, 1,3-diaminopropane (product of Koei Chemical Company Limited; 23.6 parts) and N,N-dimethylformamide (124 parts) and reacting them as in Example 2-1. The results of IR analysis of the thus-obtained resin were similar to those of Example 2-1, the hydroxyl number of the resin was 289 mgKOH/g, and the weight average molecular weight of the resin by GPC measurement was 31,000 (polystyrene equivalent). From the resin so obtained, a 50-μm thick film was formed by a similar machine and under similar conditions as in Example 2-1.

Example 2-6

A polyurethane resin was obtained by using the compound I-A (70 parts) obtained in Production Example 2-1, the compound I-C (30 parts) obtained in Production Example 2-3, hexamethylenediamine (product of Asahi Kasei Chemicals Corporation; 28.6 parts) and N,N-dimethylformamide (129 parts) and reacting them as in Example 2-1. The results of IR analysis of the thus-obtained resin were similar to those of Example 2-1, the hydroxyl number of the resin was 211 mgKOH/g, and the weight average molecular weight of the resin by GPC measurement was 30,000 (polystyrene equivalent). From the resin so obtained, a 50-μm thick single-layer film of the polyhydroxyurethane resin was formed by a similar machine and under similar conditions as in Example 2-1.

Example 2-7

A polyurethane resin was obtained by using the compound I-D (100 parts) obtained in Production Example 2-4, ethylenediamine (product of Tosoh Corporation; 23 parts) and N,N-dimethylformamide (123 parts) and reacting them as in Example 2-1. The results of IR analysis of the thus-obtained resin were similar to those of Example 2-1, the hydroxyl number of the resin was 348 mgKOH/g, and the weight average molecular weight of the resin by GPC measurement was 22,000 (polystyrene equivalent). From the resin so obtained, a 50-μm thick single-layer film of the polyhydroxyurethane resin was formed by a similar machine and under similar conditions as in Example 2-1.

Example 2-8

By a multilayer film forming machine comprised of three extruders, three feed blocks and a T-die, a multilayer sheet was formed by co-extrusion as will be described below. Described specifically, using the polyhydroxyurethane resin, which had been obtained in Example 2-1, for a layer A, a polypropylene resin (trade name: "FY-6C", product of Japan Polypropylene Corporation) for a layer B, and a modified polypropylene resin (trade name: "MODIC F534A", product of Mitsubishi Chemical Corporation) for an adhesive layer to be formed between the two layers of the layers A and B, a multilayer sheet was formed by co-extrusion while using the three extruders. The temperatures of the respective feed blocks were all set at 190° C., and the thicknesses of the respective layers were controlled to give the layer A/adhesive layer/layer B=50 μm/10 μm/90 μm. The actual measurement value of the thickness of the whole film was 150 μm. Further, the layer A was separated with a cutter, and its thickness was measured. As a result, the thickness of the layer A was found to be 50 μm.

Example 2-9

The polyhydroxyurethane resin obtained in Example 1 was dissolved in tetrahydrofuran to prepare a resin solution the concentration of which was 30%. The thus-obtained resin solution was then applied by a bar coater (No. 40) to 30-μm thick polyethylene film subjected to corona treatment on one side thereof (trade name: "LIX FILM L6120", product of Toyobo Co., Ltd.). Subsequently, the thus-coated film was heated for 10 minutes in an oven controlled at 70° C. to allow the solvent to evaporate, whereby a double-layer film with a polyhydroxyurethane resin layer formed on a polyethylene layer was formed. The thickness of the whole film was measured. As a result, it was found to be 45 μm. From this, the thickness of the polyhydroxyurethane resin layer formed on the polyethylene film as a base material was found to be 20 μm.

Comparative Example 2-1

Charged into a reaction vessel equipped with a stirrer and an open reflux condenser were dihydroxyethyl bisphenol A having a hydroxyl number of 358.3 (trade name: "AE-2", product of Meisei Chemical Works, Ltd.; 100 parts) and hexamethylene diisocyanate (product of Asahi. Kasei Chemicals Corporation; 53.8 parts). Further added were N,N-dimethylformamide (358.9 parts) as a reaction solvent and dibutyltin dilaurate (0.003 parts) as a catalyst. Under stirring at a temperature of 100'C, a reaction was conducted for 24 hours. After the reaction, the reaction mixture was poured into methanol to separate out the reaction product. The reaction product was collected by filtration, and was then dried at 80° C. for 24 hours to obtain a polyurethane resin. The weight average molecular weight of the thus-obtained resin by GPC measurement was 42,000 (polystyrene equivalent). The polyurethane resin obtained in this comparative example was an ordinary polyurethane resin free of hydroxyl groups. Using the polyurethane resin obtained as described above, a 50-μm thick single-layer film of the urethane resin was formed by a similar machine and under similar conditions as in Example 2-1, and the film was used.

Comparative Example 2-2

In this comparative example, a 30% aqueous solution of a completely saponified polyvinyl alcohol resin (trade name: "PVA-105", product of Kuraray Co., Ltd.) was prepared, and was applied to a release paper by a bar coater (No. 40). The solvent was allowed to evaporate at 70° C. to form a film, and the film was used. The thickness of the film was 20 μm. The evaluation of the resin in this case was performed by using "PVA-105" powder as it was, and the film evaluation was performed on the film so formed.

Comparative Example 2-3

In this comparative example, an ethylene-vinyl alcohol copolymer resin having an ethylene content of 32 mol % (trade name: "PVA-105", product of Kuraray Co., Ltd.) was used, a 50-μm thick film was formed in a similar manner as in Example 1, and the film was used. The evaluation of the resin was performed by using "F-104B" pellets as they were, and the film evaluation was performed on the film so formed.

Comparative Example 2-4

In this comparative example, the polypropylene resin used in Example 2-8 (trade name: "FY-6C", product of Japan Polypropylene Corporation) was used, and a single-layer film formed as will be described below was used. The above-described formation of the film with the polypropylene resin was conducted by a 20-mm diameter, single screw extruder, which was fitted with a T-die, under conditions of a cylinder temperature of 190° C., a roll temperature of 30° C. and a take-up rate of 1 m/min. The thickness of the film so obtained was 100 μm.

Comparative Example 2-5

In this comparative example, the 30-μm polyethylene film used as a base material in Example 2-9 was used as it was.

Evaluation

The resins obtained or films formed from the resins in the above-described Examples 2-1 to 2-9 and Comparative Examples 2-1 to 2-3 were evaluated for performance. The evaluation was conducted on the below-described test items by the below-described methods. The values of properties of the polyhydroxyurethane resins obtained in the respective examples and the evaluation results of the single-layer films also obtained in the respective examples are summarized in Table 2-1-1, and the evaluation results of the multilayer films obtained by using the resins are shown in Table 2-2. With respect to Comparative Examples 2-1 to 2-3, the values of properties of the used resins and the evaluation results of single-layer films of the resins are summarized in Table 2-1-2. Further, the physical properties of the conventional films in Comparative Examples 2-4 and 2-5 are also shown in Table 2-2.

[Content of Carbon Dioxide]

The content of carbon dioxide was determined by calculating the mass % of segments, which had been derived from carbon dioxide as a raw material, in the chemical structure of each polyurethane resin used. Described specifically, the contents of carbon dioxide were indicated by values as calculated from the theoretical amounts of carbon dioxide contained in the monomers used upon synthesis of the compounds I-A to I-D which were in turn used in the synthesis reactions of the respective polyurethane resins. In the case of Example 2-1 for example, the segments derived from carbon dioxide accounted for 20.5% of the used compound I-A. Therefore, the content of carbon dioxide in the polyurethane of Example 2-1 was (100 parts×20.5%)/total amount, i.e., 117.3 parts=17.5 mass %.

[Molecular Weight]

Each molecular weight was measured by the measuring instrument and under the measuring conditions described in the corresponding example.

[Solubility (in Organic Solvents)]

With respect to each resin, its solubility was measured in each of two solvents of different types, that is, N,N-dimethylformamide and tetrahydrofuran. The solubility was ranked "A" when dissolved in both of the solvents, "B" when dissolved in one of the solvents, and "C" when dissolved in neither of the solvents. As dissolution conditions, the solubility was determined at a solid content of 10% and 23° C.

[Solubility (in Water)]

With respect to each resin, its solubility in water was measured. The resin was dissolved at 23° C. to a solid content of 10%. Those which dissolved completely were ranked "A", while those which did not dissolve were ranked "B".

[Thermal Melting Properties]

With respect to each resin, its melt flow rate (MFR) was measured at 150° C. pursuant to JIS K-7210, and its value (g/10 min) was used as a value for evaluation Each resin is indicated "not flowed" when it did not melt and its measurement was not feasible. The measurement was conducted by a melt flow indexer ("Model L202", manufactured by Takara Kogyo Co., Ltd.).

[Hydroxyl Number]

With respect to each resin, its hydroxyl number was measured by a titration method that is pursuant to JIS K-0070. The content of hydroxyl groups per gram of the resin was expressed in equivalent milligrams of KOH. It is to be noted that the unit is mgKOH/g.

[Film Thickness]

The thickness of each film was actually measured by using a precision thickness gauge (manufactured by Ozaki Mfg. Co., Ltd.).

[Strength at Rupture]

The strength at rupture of each film was determined pursuant to JIS K-6251 by measuring its rupture strength at room temperature (25° C.) according to a measuring method making use of an autograph (trade name: "AGS-J", manufactured by Shimadzu Corporation).

[Total Light Transmittance and Haze]

Pursuant to JIS K-7105, each film was measured by a haze meter ("HZ-1", manufactured by Suga Test Instruments Co., Ltd.) A total quantity light as measured by a haze meter is a total light transmittance, and the ratio of a diffuse transmittance to the total light transmittance is a haze.

Haze (%) = diffuse transmittance (%) ÷ total light transmittance (%)

[Gas Barrier Properties]

With respect to each film, its oxygen permeation rate was measured pursuant to JIS K-7126, and the oxygen permeation rate was used as a value for the evaluation of gas barrier properties. Specifically, as this value becomes smaller, the gas barrier properties can be determined to be better. Described specifically, the oxygen permeation rate was measured by an oxygen permeation rate measurement system ("OX-TRAN 2/21ML", manufactured by MOCON Inc.) under respective constant-temperature/constant-humidity conditions controlled at a temperature of 23° C. and at a humidity of 30%, a humidity 65% and a humidity of 90%.

TABLE 2-1-1

Physical Properties of Resins and Films in Examples

| | Item | | Unit | Ex. 2-1 | Ex. 2-2 | Ex. 2-3 | Ex. 2-4 | Ex. 2-5 | Ex. 2-6 | Ex. 2-7 |
|---|---|---|---|---|---|---|---|---|---|---|
| Resin | Content of carbon dioxide | | mass % | 16.1 | 17.5 | 15.6 | 20.4 | 22.7 | 16.8 | 27.7 |
| | Molecular weight | | Mw | 43,000 | 42,000 | 31,000 | 35,000 | 31,000 | 30,000 | 22,000 |
| | Solubility (in organic solvents) | | | A | A | A | A | A | A | A |
| | Solubility (in water) | | | B | B | B | B | B | B | B |
| | Thermal melting properties (MFR/150° C.) | | g/10 min | 4.1 | 3.2 | 2.9 | 6.4 | 5.5 | 5.3 | 2.1 |
| | Hydroxyl number | | mgKOH/g | 204 | 221 | 195 | 258 | 289 | 211 | 348 |
| Film | Film thickness | | μm | 50 | 50 | 50 | 50 | 50 | 50 | 50 |
| | Oxygen | 23° C./35% RH | *1 | 8 | 4 | 5 | 5 | 15 | 7 | 1 |
| | permeation rate | 23° C./65% RH | *1 | 8 | 4 | 4 | 6 | 17 | 7 | 2 |
| | | 23° C./90% RH | *1 | 11 | 10 | 4 | 13 | 30 | 11 | 2 |
| | Film strength at rupture (MPa) | | MPa | 39 | 38 | 42 | 33 | 35 | 35 | 45 |
| | Total light transmittance | | % | 91.9 | 91.9 | 91.3 | 92.5 | 91.9 | 92.0 | 90.3 |
| | Haze | | % | 0.3 | 0.3 | 0.3 | 0.5 | 0.4 | 0.3 | 2.0 |

*1: unit ($O_2$ mL/m$^2$ · 24 h · atm)

TABLE 2-1-2

Physical Properties of Resins and Films in Comparative Examples

| | Item | | Unit | Comp. Ex. 2-1 | Comp. Ex. 2-2 | Comp. Ex. 2-3 |
|---|---|---|---|---|---|---|
| Resin | Content of carbon dioxide | | mass % | 0.0 | 0.0 | 0.0 |
| | Molecular weight | | Mw | 42,000 | Unmeasurable*2 | Unmeasurable*2 |
| | Solubility (in organic solvents) | | | A | C | C |
| | Solubility (in water) | | | B | A | B |
| | Thermal melting properties (MFR/150° C.) | | g/10 min | 2.7 | Not flowed | Not flowed |
| | Hydroxyl number | | mgKOH/g | 0 | Unmeasurable*2 | Unmeasurable*2 |
| Film | Film thickness | | μm | 50 | 20 | 50 |
| | Oxygen | 23° C./35% RH | *1 | 65 | ≤1 | ≤1 |
| | permeation rate | 23° C./65% RH | *1 | 70 | 10 | ≤1 |
| | | 23° C./90% RH | *1 | 64 | ≥200 | 3 |
| | Film strength at rupture (MPa) | | MPa | 32 | 60 | 53 |
| | Total light transmittance | | % | 89.1 | 90.3 | 90.5 |
| | Haze | | % | 5.1 | 2.1 | 2 |

*1: unit ($O_2$ mL/m$^2$ · 24 h · atm)
*2: Not dissolved in the measurement solvent, and unmeasurable.

TABLE 2-2

Physical Properties of Resins and Films in Examples and Comparative Examples

| Item | | Unit | Ex. 2-8 | Ex. 2-9 | Comp. Ex. 2-4 | Comp. Ex. 2-5 |
|---|---|---|---|---|---|---|
| Thickness | | μm | 150 | 45 | 100 | 30 |
| Film structure | | | 3 layers | 2 layers | single layer | single layer |
| Oxygen permeation rate | 23° C./ 35% RH | *1 | 6 | 14 | 640 | 6,000 |
| | 23° C./ 65% RH | *1 | 7 | 15 | 640 | 6,100 |
| | 23° C./ 90% RH | *1 | 10 | 17 | 650 | 6,100 |
| Strength at rupture | | MPa | 38 | 39 | 38 | 40 |
| Total light transmittance | | % | 91.5 | 92.7 | 93.2 | 92.2 |
| Haze | | % | 1.6 | 1.6 | 1.4 | 1.1 |

*1: unit ($O_2$ mL/m$^2$ · 24 h · atm)

As is evident from Table 2-1-1 and Table 2-1-2, it has been confirmed that the barrier films (resin layers) of the polyhydroxyurethane resins, which were used in the examples and characterize the present invention, exhibit excellent gas barrier properties and transparency without being affected by humidity. Especially in the case of the polyhydroxyurethane resins used in the examples, the oxygen permeation rates were lowered to one severalth compared with the polyurethane resin of the hydroxyl-free structure in Comparative Example 2-1. This clearly indicates that the distinct hydroxyl-containing chemical structures of the polyhydroxyurethane resins used in the examples contributed to the improved gas barrier properties of the resin layers formed with the polyhydroxyurethane resins. Moreover, these distinct chemical structures are derived from carbon dioxide as a raw material, so that the polyhydroxyurethane resins used in the examples have, as resins produced from carbon dioxide, excellent environmental friendliness not found on the existing resins.

As is also evident from the values of properties of the resins in Table 2-1-1 and Table 2-1-2, the polyhydroxyurethane resins used in the examples are, different from PVA and EVOH employed as materials for gas barrier films at present, soluble in organic solvents and also excellent in heat melting properties, so that they are also superb in processability. As described in Table 2-2, multilayer films can be produced by both a melt forming method and a coating method. Moreover, the multilayer films obtained as described above have all been confirmed to exhibit excellent gas barrier properties.

INDUSTRIAL APPLICABILITY

[First Aspect]

As has been described above, according to the first aspect of the present invention, the use of the polyhydroxyurethane resin, which has been obtained using the cyclic carbonate compound and amine compound as raw materials, as a gas barrier layer makes it possible to obtain a gas barrier material which has been unavailable by the conventional technologies and is excellent as a solution to environmental problems. With the polyhydroxyurethane resin that characterizes the first aspect of the present invention, the gas barrier layer can be formed by a simple method, and moreover, the gas barrier layer is also excellent in the adhesiveness to a base material. Accordingly, the polyhydroxyurethane resin can be expected to find utility in gas barrier materials combined with various base materials. As the polyhydroxyurethane resin can use carbon dioxide as a raw material, the first aspect of the present invention provides a technology that is also prospective from the standpoint of global environmental protection.

[Second Aspect]

As has been described above, according to the second aspect of the present invention, the use of the polyhydroxyurethane resin, which has been obtained using the cyclic carbonate compound and amine compound as raw materials, as a gas barrier layer makes it possible to obtain an excellent gas barrier film, which has been unavailable by the conventional technologies, does not have much humidity dependency and does not contain any halogen compound that produces hazardous gas. Upon production of the film, a melt forming method and a coating method are both applicable. Therefore, the polyhydroxyurethane resin is excellent in processability, and is industrially useful. As the polyhydroxyurethane resin that characterizes the second aspect of the present invention can use carbon dioxide as a raw material, the second aspect of the present invention provides a technology that is also prospective from the standpoint of global environmental protection.

The invention claimed is:

1. A coating composition for forming a gas barrier layer that exhibits gas barrier properties, the coating composition comprising:
   a carbonate compound having at least three 5-membered cyclic carbonate groups as Component A; and
   an amine compound having at least two amino groups as Component B,
   wherein the carbonate compound and the amine compound in the composition react at an equivalent ratio of functional groups from 0.8 to 1.25 so as to form polyhydroxyurethane resin as a principal component in the gas barrier layer, and
   the equivalent ratio of functional groups is obtained by a following formula:

Equivalent ratio=(mass of the carbonate compound in the coating composition×a number of functional groups in the carbonate compound/molecular weight of the carbonate compound)/ (mass of the amine compound in the coating composition×a number of functional groups in the amine compound/molecular weight of the amine compound), where the number of functional groups in the carbonate compound means a number of cyclic carbonate structures in a molecule of the carbonate compound, and
   the number of functional groups in the amine compound means a number of amino groups in a molecule of the amine compound, and
   wherein the carbonate compound is at least one compound selected from the group consisting of

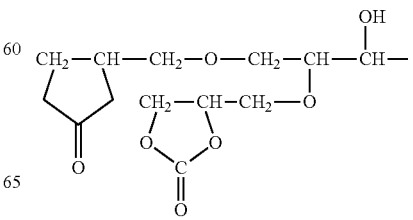

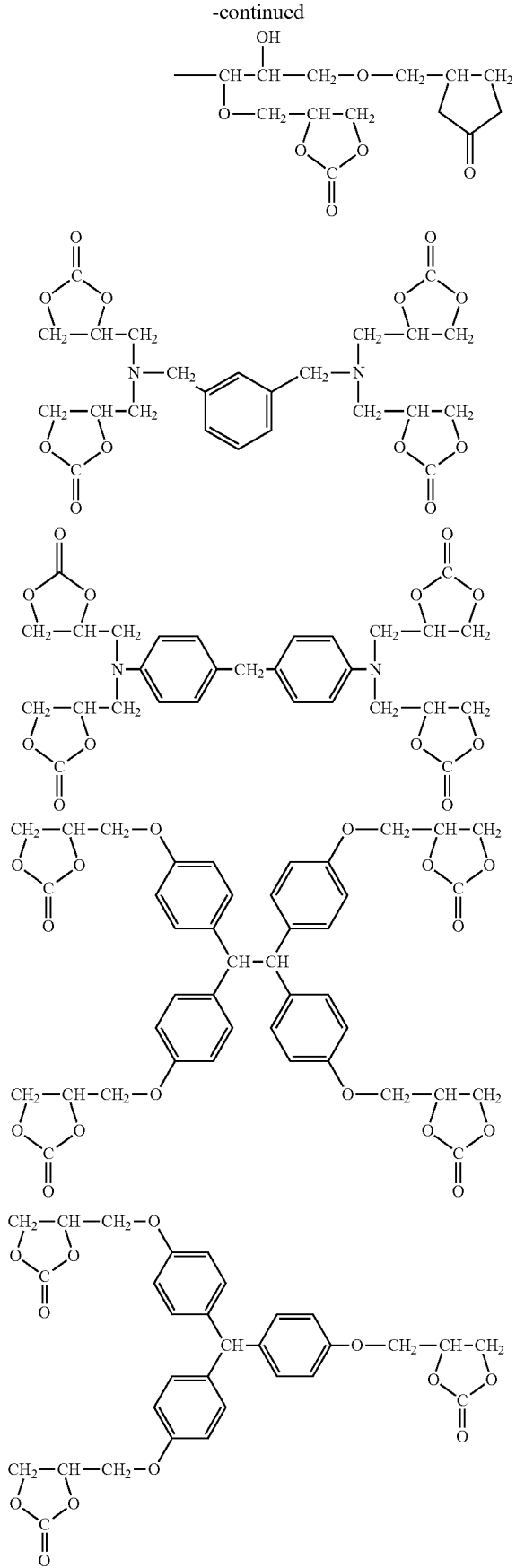
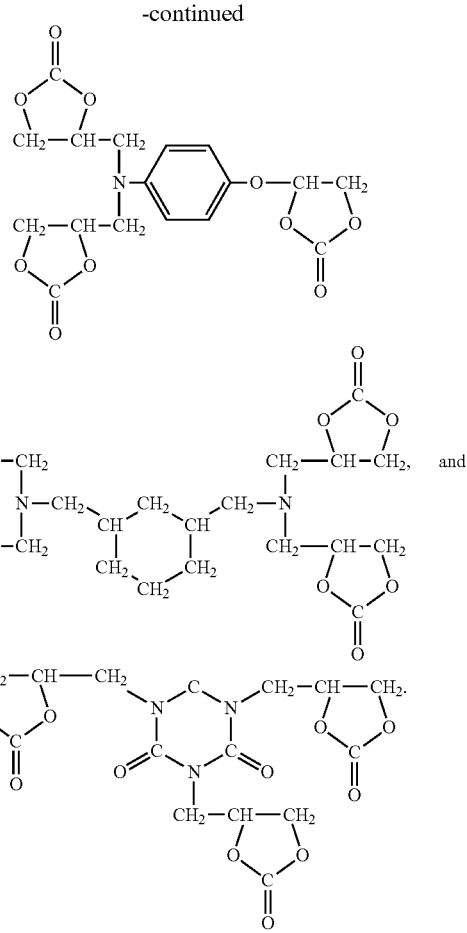

2. The coating composition according to claim 1,
   wherein carbon dioxide has been used as a raw material for —CO—O— bonds in the 5-membered cyclic carbonate groups, and
   the gas barrier layer comprises the —CO—O— bonds derived from the carbon dioxide in an amount from 1 to 30 mass % relative to the gas barrier layer formed from the coating composition.

3. The coating composition according to claim 1, wherein the amine compound having the amino groups as the Component B comprises meta-xylylenediamine, 1,3-bis(aminomethyl)cyclohexane, or a combination thereof.

4. A gas barrier film, comprising a gas barrier layer formed from the coating composition according to claim 1,
   wherein the gas barrier film is a single gas barrier film or a multilayer gas barrier film,
   the gas barrier layer has a thickness in a range from 0.1 to 200 μm, and
   the gas barrier layer has an oxygen permeation rate of no higher than 50 mL/m$^2$·24 h·atm at a temperature of 23° C. and humidity in a range from 0% to 90% when measured according to JIS K-7126.

5. A production method of a gas barrier film formed of a single layer or multiple layers, at least one of said layer or layers that forms or form the gas barrier film being a gas barrier layer that exhibits gas barrier properties, which comprises:
   applying, to a surface of a base material or a surface of a release paper, a coating composition, wherein the coating composition comprises:
a carbonate compound having at least three 5-membered cyclic carbonate groups as Component A; and
an amine compound having at least two amino groups as Component B,
wherein the carbonate compound and the amine compound react at an equivalent ratio of functional groups, as defined by a following equation, from 0.8 to 1.25 so as to form the polyhydroxyurethane resin, and
the equivalent ratio of functional groups is obtained by a following formula:

Equivalent ratio=(mass of the carbonate compound in the coating composition×number of functional groups in the carbonate compound/molecular weight of the carbonate compound)/(mass of the amine compound in the coating composition×number of functional groups in the amine compound/molecular weight of the amine compound), where the number of functional groups in the carbonate compound means a number of cyclic carbonate structures in a molecule of the carbonate compound, and the number of functional groups in the amine compound means a number of amino groups in a molecule of the amine compound, and wherein the carbonate compound is at least one compound selected from the group consisting of

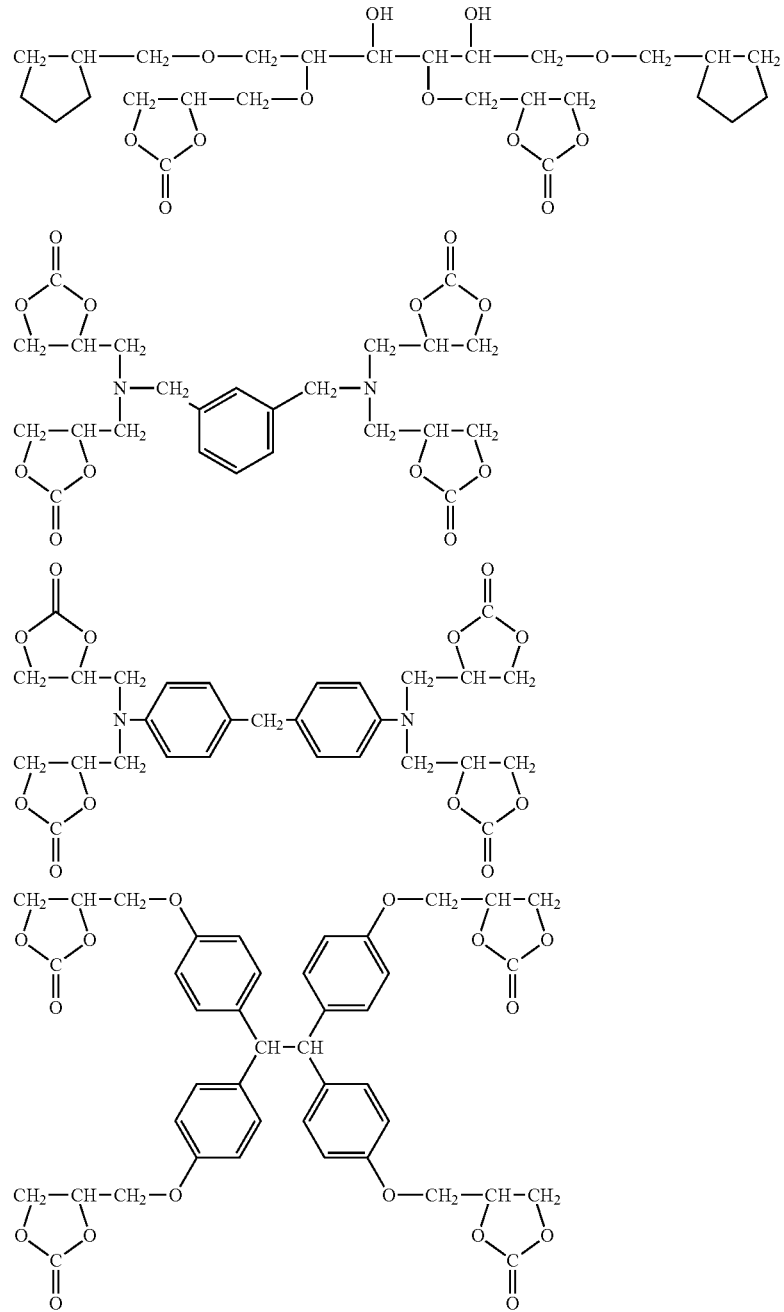

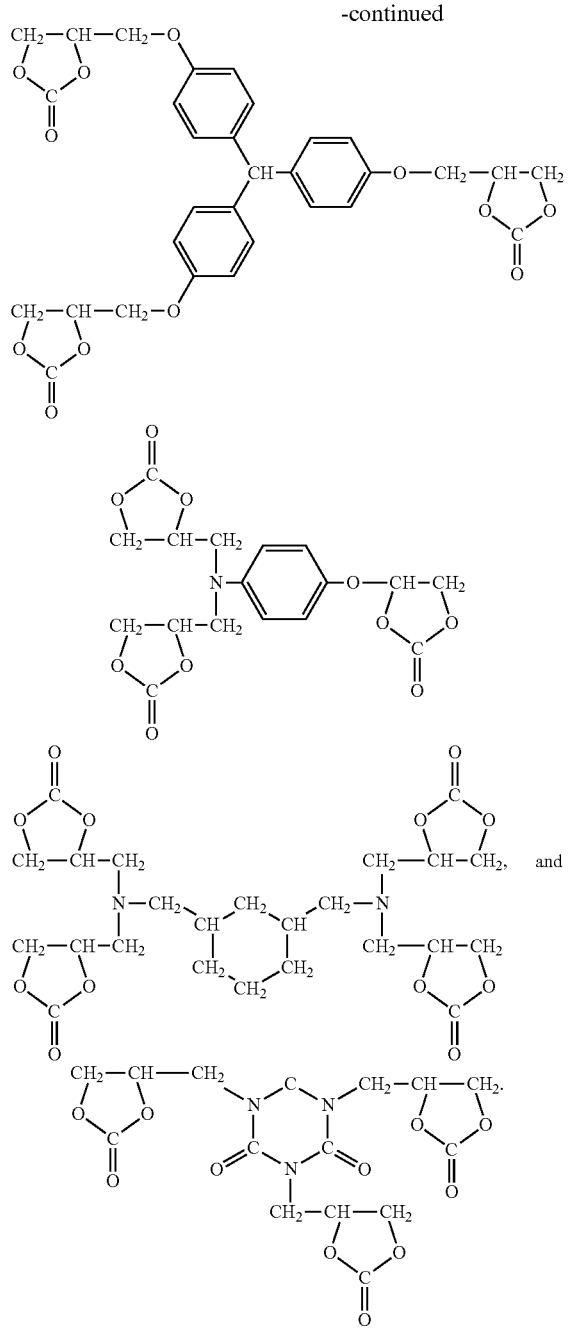

6. The production method according to claim 5, wherein the amine compound having the amino groups as the Component B comprises meta-xylylenediamine, 1,3-bis(aminomethyl)cyclohexane, or a combination thereof.

7. A method for protecting a material from gas present in an environment, comprising:
  covering the material with a gas barrier film so as to prevent the gas from permeating through the gas barrier film,
  wherein the gas barrier film is formed of a single layer or multiple layers,
  the single layer or at least one of said multiple layers exhibits gas barrier properties,
  the layer that exhibits the gas barrier properties comprises
    a film that comprises a polymer having, as a repeating unit in a main chain of the polymer, at least one chemical structure selected from the group consisting of structures represented by following formulas from (2-1) to (2-4), and
  the polymer is polyhydroxyurethane resin comprising, as monomer units, a carbonate compound having two 5-membered cyclic carbonate groups and an amine compound having at least two amino groups, and
  the polymer is obtained by an addition reaction of the monomer units, Formula (2-1)

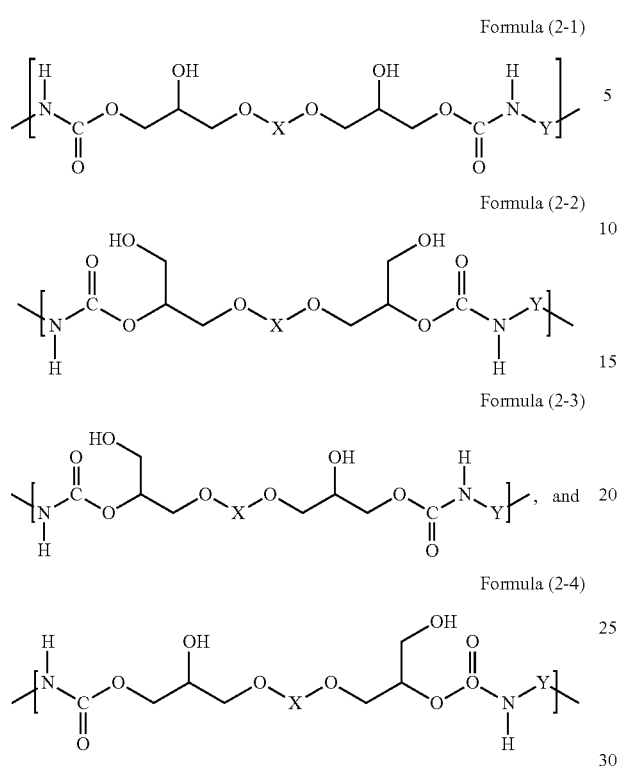

Formula (2-2)

Formula (2-3)

, and

Formula (2-4)

wherein Xs and Ys represent chemical structures formed of hydrocarbons or aromatic hydrocarbons derived from the monomer units, and the structures may each contain at least one hetero atom selected from the group consisting of oxygen, nitrogen, and sulfur, wherein the carbonate compound is at least one compound selected from the group consisting of

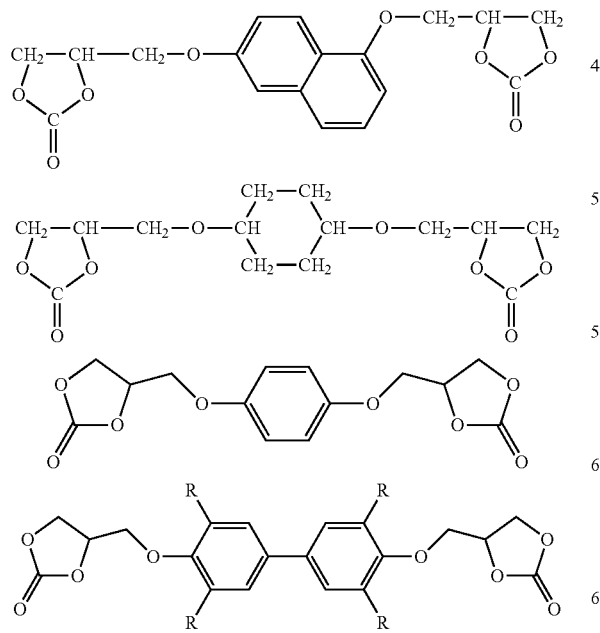

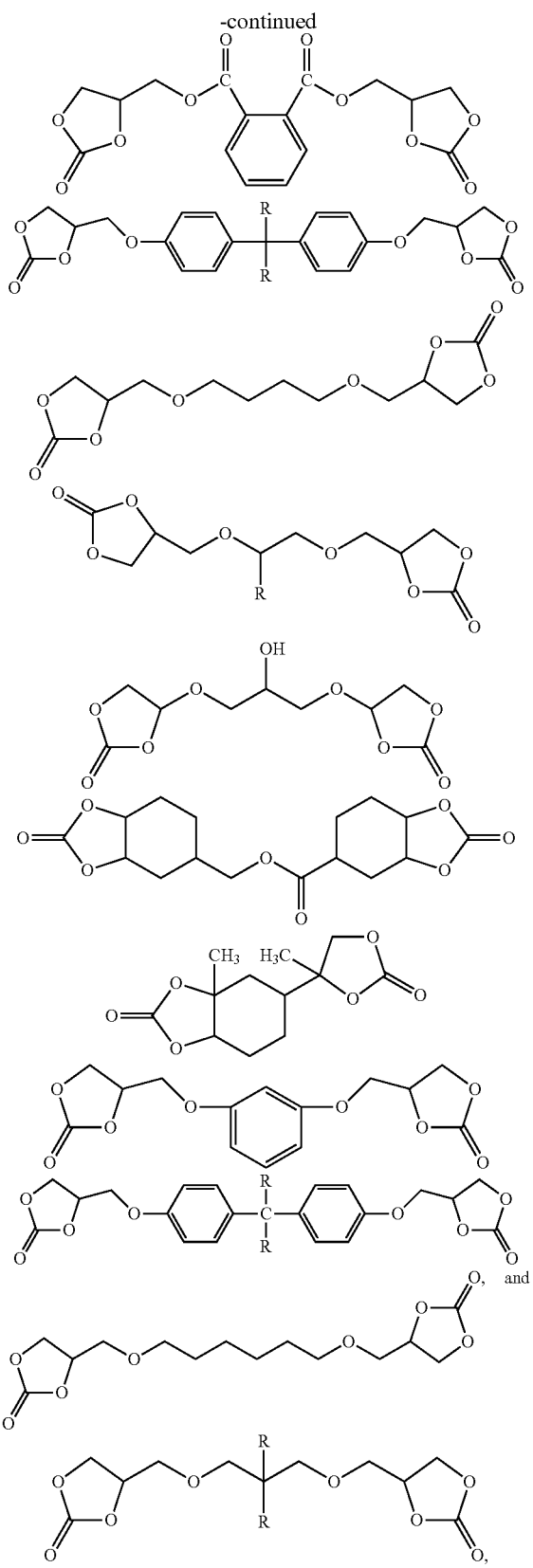

where R is hydrogen or $CH_3$, the amine compound is selected from the group consisting of linear aliphatic polyamines, cyclic aliphatic polyamines, aliphatic polyamines having aromatic rings, and aromatic polyamines, the layer that exhibits the gas barrier properties has a thickness in a range from 0.1 to 100 μm, and the polymer film has an oxygen permeation rate of no higher than 50 mL/m²·24 h·atm at a temperature of 23° C. and humidity in a range from 0% to 90% when measured according to JIS K-7126.

8. The method according to claim 7, wherein the material is at least one material selected from the group consisting of foods, pharmaceuticals, cosmetics, and daily necessaries.

9. The method according to claim 7, wherein the polyhydroxyurethane resin has a weight average molecular weight in a range from 10,000 to 100,000 and a hydroxyl number in a range from 180 to 350 mgKOH/g.

10. The method according to claim 7, wherein the carbonate compound has been synthesized using carbon dioxide as a raw material, and —O—CO— bonds derived from the carbon dioxide account for from 1 to 30 mass % relative to the polyhydroxyurethane resin, which is obtained using the carbonate compound as the monomer unit.

11. The method according to claim 7, wherein the single layer or at least one of the multiple layers that exhibits the gas barrier properties is formed by a process comprising:

applying a solution of an organic solvent comprising the polyhydroxyurethane resin, which is defined in claim 7, to a base material, and evaporating a volatile component in the solution such that the layer that exhibits the gas barrier properties is formed on the base material.

12. The method according to claim 7, wherein the single layer or at least one of the multiple layers that exhibits the gas barrier properties is formed by a process comprising melt extrusion.

13. The production method according to claim 5, the method further comprising a step of heating of the applied coating composition so that a curing reaction between the carbonate compound and the amine compound proceeds, and thereby the gas barrier layer is formed.

14. The method according to claim 7, wherein the carbonate compound is at least one compound selected from the group consisting of

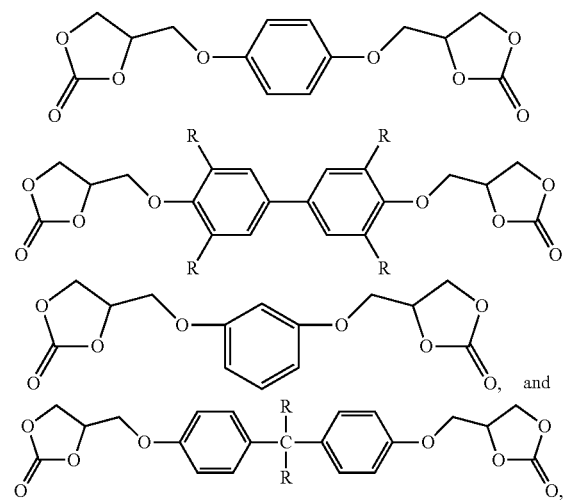

wherein R is hydrogen or $CH_3$.

15. The method according to claim 7, wherein the amine compound is selected from the group consisting of ethylenediamine, 1,3-diaminopropane, 1,4-diaminobutane, 1,6-diaminohexane, 1,8-diaminooctane, 1,10-diaminodecane, 1,12-diaminododecane, isophoronediamine, norbornanediamine, 1,6-cyclohexanediamine, piperazine, 2,5-diaminopyridine, xylylenediamine, methaphenylenediamine, and diaminodiphenylmethane.

16. The method according to claim 7, wherein the amine compound is xylylenediamine.

17. The method according to claim 14, wherein the amine compound is xylylenediamine.

18. The method according to claim 7, wherein the layer that exhibits the gas barrier properties has a thickness of 10-50 μm.

* * * * *